(12) United States Patent
Tomioka et al.

(10) Patent No.: US 6,606,748 B1
(45) Date of Patent: Aug. 12, 2003

(54) INFORMATION PROVIDING METHOD WHICH ENABLES DATA COMMUNICATION COSTS TO BE REDUCED, AND INFORMATION PROVIDING SYSTEM FOR IMPLEMENTING THE METHOD

(75) Inventors: Yutaka Tomioka, Yokohama (JP); Fumiyuki Kato, Yokohama (JP); Nobuaki Tanaka, Kawasaki (JP); Kenji Soma, Tokyo (JP); Yukio Shikatani, Yokohama (JP); Yoshiaki Kushiki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/036,696

(22) Filed: Mar. 9, 1998

(30) Foreign Application Priority Data

Mar. 9, 1997 (JP) .............................. 9-072738

(51) Int. Cl.⁷ .......................... H04N 5/445; G06F 3/00; G06F 13/00
(52) U.S. Cl. .............................. 725/50; 725/49; 725/40; 725/39
(58) Field of Search .............................. 725/39, 40, 44, 725/45, 46, 47, 48, 49, 50, 53, 54, 55, 56, 57, 61, 136, 86, 96; H04N 5/445, 7/173; G06F 3/00, 13/00

(56) References Cited

U.S. PATENT DOCUMENTS

| | | | | |
|---|---|---|---|---|
| 4,751,578 A | * | 6/1988 | Reiter et al. ................. | 348/564 |
| 5,321,750 A | * | 6/1994 | Nadan ........................ | 348/476 |
| 5,404,505 A | * | 4/1995 | Levinson ....................... | 707/10 |
| 5,515,106 A | * | 5/1996 | Chaney et al. ................. | 725/48 |
| 5,552,833 A | * | 9/1996 | Henmi et al. ................. | 348/460 |
| 5,559,549 A | * | 9/1996 | Hendricks et al. ............. | 725/50 |
| 5,579,055 A | * | 11/1996 | Hamilton et al. .............. | 725/49 |
| 5,592,551 A | * | 1/1997 | Lett et al. .................... | 380/211 |
| 5,594,509 A | * | 1/1997 | Florin et al. ................. | 348/565 |
| 5,652,613 A | * | 7/1997 | Lazarus ........................ | 725/50 |
| 5,657,072 A | * | 8/1997 | Aristides et al. .............. | 725/46 |
| 5,666,645 A | * | 9/1997 | Thomas et al. ................ | 725/47 |
| 5,686,954 A | * | 11/1997 | Yoshinobu et al. ............ | 725/43 |
| 5,699,125 A | * | 12/1997 | Rzeszewski et al. .......... | 725/50 |
| 5,734,781 A | * | 3/1998 | Cantone ....................... | 386/46 |
| 5,760,821 A | * | 6/1998 | Ellis et al. .................... | 735/50 |

(List continued on next page.)

FOREIGN PATENT DOCUMENTS

| | | |
|---|---|---|
| EP | 0662771 | 7/1995 |
| EP | 0721263 | 7/1996 |
| EP | 0758833 | 2/1997 |
| KR | 1996-705439 | 10/1996 |
| WO | WO 96/0318 | 2/1996 |

*Primary Examiner*—Vivek Srivastava

(57) ABSTRACT

An information method and system enables information, from a set of original information which is updated at regular or irregular intervals, to be provided to each information receiving apparatus of respective users via a data transmission path which can be selected in accordance with the type of data to be transferred, stated preferences of the user with regard to providing of data, current operating status of a data communication network, etc. A set of framework data are selected as data which are rarely updated, by monitoring original information that is to be provided, over a suitably long period, and are stored at the information providing apparatus and each information receiving apparatus. Thereafter until a new set of framework data are selected, any differences between newly updated original information and the framework data are obtained as variation data, and transmitted to be stored at each information receiving apparatus, which can reconstitute desired data on request from a user by combining appropriate parts of the locally stored framework and variation data, thereby minimizing the amounts of data which must be transmitted to the information receiving apparatuses.

35 Claims, 9 Drawing Sheets

U.S. PATENT DOCUMENTS

| | | | |
|---|---|---|---|
| 5,973,685 A | * 10/1999 | Schaffa et al. | 725/50 |
| 6,057,890 A | * 5/2000 | Virden et al. | 348/563 |
| 6,216,264 B1 | * 4/2001 | Maze et al. | 725/53 |
| 6,216,265 B1 | * 4/2001 | Roop et al. | 725/54 |
| 6,311,329 B1 | * 10/2001 | Terakado et al. | 725/44 |
| 6,374,237 B1 | * 4/2002 | Reese | 707/3 |
| 6,446,082 B1 | * 9/2002 | Arita | 707/104.1 |
| 6,460,018 B1 | * 10/2002 | Kasai et al. | 725/50 |
| 6,507,950 B1 | * 1/2003 | Tsukidate et al. | 725/54 |
| 2002/0147976 A1 | * 10/2002 | Yuen et al. | 725/40 |

* cited by examiner

FIG. 3

FRAMEWORK DATA : TV CHANNEL 10, EACH MONDAY

| STARTING TIME POINTS | PROGRAM DURATION (MINUTES) | PROGRAM NAME |
|---|---|---|
| 04:30 | 60 | MORNING NEWS |
| 20:00 | 120 | MONDAY NIGHT MOVIE |
| 22:00 | 30 | NEWS SUMMARY |
| 22:30 | 60 | MUSIC CENTER |

FIG. 4

VARIATION DATA : TV CHANNEL 10, MONDAY 12 NOVEMBER

| PROGRAM NAME | "NEW PROGRAM" MARKER | STARTING TIME POINT (NEW PROGRAM) | PROGRAM DURATION (NEW PROGRAM) (MINS.) | STARTING TIME POINT CHANGE AMOUNT (MINS.) | PROGRAM DURATION CHANGE AMOUNT (MINS.) | TITLE OF PERFORMANCE |
|---|---|---|---|---|---|---|
| MONDAY NIGHT MOVIE | 0 | | | | +15 | "LOST HORIZON" |
| NEWS SUMMARY | 0 | | | +15 | −15 | |
| EVENING TALK SHOW | 1 | 22:30 | 60 | | | |
| | | | | | | |

FIG. 5

CURRENT PROGRAM DATA

| BROADCASTING DATE | TV CHANNEL | BROADCAST TIME PERIOD | PROGRAM NAME | PERFORMANCE TITLE |
|---|---|---|---|---|
| MONDAY, 12 NOVEMBER | 10 | 20:00-22:15 | MONDAY NIGHT MOVIE | "LOST HORIZON" |
| MONDAY, 12 NOVEMBER | 10 | 22:15-22:30 | NEWS SUMMARY | |
| MONDAY, 12 NOVEMBER | 10 | 22:30-23:30 | EVENING TALK SHOW | |

…

INFORMATION PROVIDING METHOD WHICH ENABLES DATA COMMUNICATION COSTS TO BE REDUCED, AND INFORMATION PROVIDING SYSTEM FOR IMPLEMENTING THE METHOD

BACKGROUND OF THE INVENTION

1. Field of the Invention

The present invention relates to an information providing method and to an information providing system for applying the method, and in particular to a method and apparatus for providing, to a plurality of users, information consisting both of data which are altered only infrequently and data which are updated frequently, such as television broadcast program schedules.

2. Description of the Related Art

In recent years, various types of information providing system have been developed whereby an information providing apparatus (i.e., server), dispatches various types of information to the information receiving apparatuses of respective users (i.e., clients) via respective data transmission paths. The transmission paths may for example be implemented in the Internet, or in an intranet of a large corporation, or data may be sent to the clients as broadcast television signals, in the form of character data which are transmitted in the vertical blanking intervals of a broadcast television signal (e.g., the VBI method). In general, the information providing function is performed on an interactive basis, whereby a user can transmit a request to the information providing apparatus for some specific desired information. The types of information which are transmitted by such an information providing system can consist for example of program schedule information for multi-channel television broadcasts, catalog information concerning articles for sale, etc. In the case of television broadcast schedules, a user might for example transmit to the information providing apparatus a request for a complete program schedule for one or more television channels, relating to one or more specified days, or for detailed information concerning one specific broadcast of a program.

With a prior art type of information providing apparatus, the information providing apparatus responds to such a request sent by a user from a terminal by, for example, converting all of the the requested information into HTML format data, then dispatching all of the resultant data to the terminal via an Internet communication path, or by broadcast radio waves which are transmitted to the user's television receiver through a technique such as VBI.

In practice, the information which is provided by such an information providing system will basically contain information which changes very infrequently (or is never changed), and information which will often be changed. In the case of a television broadcast schedule for example, a certain program might be broadcast at the same time of day on a specific weekday of each week throughout the year, while some or all of the attributes (program name, performers, etc.) might also remain unchanged over the same period. However with a prior art type of information providing apparatus, irrespective of whether a user has previously received such information, that same information may be sent to that user many times. In the case of such information being dispatched via a transmission path which uses a data communication facility such as the Internet, such repetitive transmission of the same information to a user represents a significant waste of communication time, and a corresponding unnecessary increase in communication costs. Also, if the information is transmitted as HTML format data, then since this results in additional data being sent in order to achieve such formatting (i.e., in addition to the data expressing the actual information that is to be conveyed to a user.), the communication cost is further increased. This has been an obstacle to the widespread adoption of such types of information providing system for general household use.

SUMMARY OF THE INVENTION

It is an objective of the present invention to overcome the problems of the prior art set out hereinabove, by providing an information providing method and an information providing system for implementing the method, whereby the communication costs and complexity of processing which are associated with the dispatching of information to users can be reduced, and whereby information can be supplied to users with communication costs which are matched to the services provide.

To achieve the above objectives, an information providing method and information providing system according to the present invention have the following basic features. An information providing apparatus processes original information which serves as a data base, and which is updated at regular or irregular intervals, to separate the original information into first data which are substantially fixed, i.e., which are known to change only relatively infrequently or which undergo only relatively small amounts of variation when changes occur due to updating, and second data consisting of data which are known to change relatively frequently or which undergo relatively large amounts of variation when changes occur due to updating. When the first data and second data have first been respectively generated, the information providing apparatus stores these as respectively separate data categories, and transmits them to each information receiving apparatus of respective users to be stored therein. Thereafter (until an updated set of the first data is again generated) the information providing apparatus updates the contents of the second data which are stored at the information providing apparatus, each time that a new set of original information is acquired. Specifically, the information providing apparatus compares any newly acquired original information with the stored first data, to thereby obtain (as updated second data) any data which are contained in the new original information but not in the stored first data. The updated second data are then stored at the information providing apparatus. All of such updated second data (or parts of the updated second data which are found to be necessary at the time of a input of a request for data by a user) are also transmitted to the information receiving apparatuses of users.

It can thus be understood that the first data and second data are transmitted to each user with respectively different intervals between the transmissions of the first data and transmissions of the second data. Specifically, after initially transmitting the first data to a user, the period between subsequent transmissions of updated first data to the user will be substantially long (or only a single, initial transmission of the first data will be executed). Transmissions of updated second data to the information receiving apparatus of a user however will occur at relatively short intervals, for example each time that updated original information is acquired by the information providing apparatus.

Each information receiving apparatus is configured to be capable of receiving the first data and second data from the information providing apparatus, to store the received first data and second data as respectively separate data categories, and to perform reconstitution processing of the stored first data and second data to recover desired parts of the original information, when requested by a user.

The system is preferably configured such that records are maintained by the information providing apparatus of data (in particular, updated second data) which have already been transmitted to each information receiving apparatus, and such that, whenever updated original information are acquired by the information providing apparatus and the second data stored at the information providing apparatus are updated accordingly, the second data held at each information receiving apparatus are left unchanged until a request for data output is supplied to an information receiving apparatus. At that time, the request contents are sent to the information providing apparatus, which then judges whether it is necessary to send updated second data to that information receiving apparatus in order to correctly service the request. If so, the updated second data are transmitted, and stored at that information receiving apparatus, and the desired information is then reconstituted and output to the user.

Alternatively, the system can be configured such that whenever updated original information are acquired by the information providing apparatus, and the second data stored at the information providing apparatus are updated accordingly, the updating data are also transmitted at that time to each information receiving apparatus, to update the second data which are stored therein.

In general, the original information will consist of a set of data items, each consisting of an identifier and information concerning one or more attributes. If the original information is from a sales brochure for example, then each data item could define an article which is for sale, i.e., could consist of a code number and article name as identification information, together with information concerning attributes such as the color, weight, price, etc.

More specifically, the present invention discloses an information providing method for use with an information providing system having an information providing apparatus, at least one information receiving apparatus, and means for transferring data between the information providing apparatus and information receiving apparatus, with the method comprising:

at the information providing apparatus, separating original information which is to be provided into first data and second data, storing the first data and second data respectively separately, and subsequently reading out and transmitting the first data and second data to the information receiving apparatus, with respectively different values of time interval between successive transmissions of the first data and successive transmissions of the second data, and at the information receiving apparatus, receiving the transmitted first data and second data and storing the received first data and second data respectively separately, and subsequently responding to a request for output of a part of the original information by reading out and combining respectively parts of the stored first data and second data, to reconstitute the part of the original information;

wherein the first data are obtained from the original information as a part of the original information which satisfies a selection condition that an interval between successive updating occurrences is longer than a predetermined duration, or that an amount of change as a result of updating is no greater than a predetermined amount, and the second data are obtained from the original information as a part of the original information which does not satisfy the aforementioned selection condition.

According to another basic aspect, the invention discloses an information providing system comprising an information providing apparatus, at least one information receiving apparatus, and data transfer means for use in transmitting data between the information providing apparatus and information receiving apparatus. The information providing apparatus includes original information storage means for receiving and storing original information which is supplied from an external source and is periodically updated, data editing means for operating on the stored original information to separate the original information into first data and second data, data storage means for storing the first data and second data, and data transmitting means for transmitting data to the information receiving apparatus via the data transfer means. The first data are obtained from the original information as a part of the original information which satisfy a selection condition that an interval between successive updating occurrences is longer than a predetermined duration, or that an amount of change as a result of updating is no greater than a predetermined amount, and the second data are obtained from the original information as a part of the original information which does not satisfy the selection condition.

In addtion, an information receiving apparatus of such a system includes receiving means for receiving the first data and second data transmitted from the information providing apparatus, storage means for storing the received first data and second data, and data reconstitution means for responding to an externally supplied request for output of a currently valid part of the original information by reading out and combining selected parts of the stored first data and second data, to thereby reconstitute the part of the original information.

The data transfer means may be selected as one or a combination of a plurality of data transfer means which include a data communication path via a communication network based on dedicated communication lines or public telephone lines, a data communication path established via a terrestrial or satellite radio broadcasting system, physical transport of data stored on optical recording discs, and physical transport of data stored on magnetic recording discs, etc.

The invention is not limited to the use of only two categories of data, as the first data and second data. Specifically, the second data may be obtained from the original information as a plurality of levels of second data, the levels having successively smaller values of the interval between successive updating occurrences, or successively greater amounts of change as a result of updating.

According to another aspect, such an information receiving apparatus may further comprise means for inputting apparatus attribute information relating to the information receiving apparatus, and means for transmitting the apparatus attribute information via the data transfer means to the information providing apparatus, with the information providing apparatus further comprising means for storing the apparatus attribute information which is transmitted from the information receiving apparatus, and for modifying the selection of data to be read out from the data storage means of the information providing apparatus and transmitted to the information receiving apparatus, in accordance with the apparatus attribute information.

The attribute information specifies one or more apparatus attributes, such as the data storage capacity, image display resolution capability, data processing performance, and types of secondary data storage media which can be connected for use with the information receiving apparatus.

In addition, the information receiving apparatus may further comprise means for inputting user attribute information relating to at least one user of the information receiving apparatus, and means for transmitting the user attribute information via the data transfer means to the information providing apparatus, with the the information providing apparatus further compring means for storing the user attribute information which is transmitted from the information receiving apparatus, and for modifying the selection of data which are read out from the data storage means of the information providing apparatus and transmitted to the information receiving apparatus, in accordance with the user attribute information.

The user attributes may for example include the age, sex, interests, and area of residence of the user.

Furthermore with such an information providing system, the data transfer means may comprise a plurality of respectively different data communication paths, with the information providing apparatus further comprising storage means having stored therein attribute information relating to the data communication paths, and means for selecting from the plurality of different data communication paths an appropriate one of the data communication paths to be used for transmitting data from the information providing apparatus to the information receiving apparatus, based upon whether the first data or the second data are to be transferred, upon the stored attribute information relating to the information receiving apparatus and/or the stored attribute information relating to the user, and upon the stored attribute information for the communication paths.

With such an information providing system, the information providing apparatus may itself periodically transmit updated data to the information receiving apparatus. For example, each time that an updated set of the original information is acquired by the information providing apparatus, the information providing apparatus may compare that data with the stored first data, to thereby obtain the difference between the updated original information and stored first data as updated second data. The updated second data can then be used to update the second data which are held in the data storage means of the information providing apparatus, and also transmitted to the information receiving apparatus, to update the second data which are held in the data storage means of the information receiving apparatus.

Alternatively, the information receiving apparatus may comprise means whereby, when a request is input by a user for output, i.e., display, of a currently valid part of the original information, that request is transmitted to the information providing apparatus via the data transfer means. In that case, the information providing apparatus further comprising data dispatch record means for storing dispatch record data indicative of an updating status of the first data and second data which are currently stored at the information receiving apparatus, in relation to the first data and second data which are currently stored at the information providing apparatus. The information providing apparatus will also in that case include means which functions, based on the contents of the transmitted request and of the dispatch record data, to judge whether it necessary to transmit updated data to the information receiving apparatus in order to enable the information receiving apparatus to correctly reconstitute the required part of the original information, and will also include means whereby, when such updated data are judged to be necessary, the updated data are read out from the data storage means of the information providing apparatus and transmitted to the information receiving apparatus via the data transfer means, to be stored in the data storage means of the information receiving apparatus. The required part of the original information can then be correctly reconstituted by the information receiving apparatus, and supplied to the user.

According to another aspect, with such an information providing system, the information receiving apparatus further comprises means for inputting apparatus attribute information relating to the information receiving apparatus, and means for attaching the apparatus attribute information to the request, to be transmitted via the data transfer means to the information providing apparatus, while the information providing apparatus further comprises means for modifying the selection of data to be read out from the data storage means of the information providing apparatus and transmitted to the information receiving apparatus, in accordance with the apparatus attribute information. The apparatus attributes of the information receiving apparatus may for example include the data storage capacity, image display resolution capability, data processing performance, and types of secondary data storage media which can be connected for use with the information receiving apparatus.

In that way, data which are transmitted by the information providing apparatus to an information receiving apparatus can be selected such as to be suitable for the particular configuration and characteristics of that information receiving apparatus.

Alternatively, (or in addition to the apparatus attribute information), the information receiving apparatus can further comprise means for inputting user attribute information relating to at least one user, and means for attaching the user attribute information to the request and transmitting the resultant data via the data transfer means to the information providing apparatus, to be stored therein. In that case the information providing apparatus includes means for for selecting data to be read out from the data storage means of the information providing apparatus and transmitted to the information receiving apparatus, in accordance with the user attribute information (or the user attribute information in conjunction with the apparatus attribute information). The user attribute information can specify for example the age of the user, the sex of the user, the area of residence of the user, etc.

According to another aspect of such an information providing system, the data transfer means may comprise a plurality of respectively different data communication paths, i.e., each of which can be selected for transmitting data to the information receiving apparatus, with the information providing apparatus further comprising storage means having stored therein respective sets of attribute information for the data communication paths, and means for selecting from these data communication paths an appropriate path for transmitting data from the information providing apparatus to the information receiving apparatus, based upon whether a part of the first data or of the second data is to be transferred, upon the stored attribute information relating to the information receiving apparatus, and upon the stored attribute information relating to the communication paths. The attribute information relating to the communication paths can for example include data transfer speed and communication cost, as well as attributes which can vary dynamically, such as status of temporary interruption of a communication line or a telephone system.

In that way, it becomes possible to select an appropriate data communication path which is matched (i.e., with respect to data transfer speed and communication cost) to the type of data that are to be transmitted and also to the particular characteristics of the information receiving apparatus to which the data art to be transmitted.

Furthermore, it is also possible to extend such means for selecting the data communication path, to also take into account the characteristics or preferences of a user of the information receiving apparatus, i.e., when such customized user attribute information has been supplied to the information providing apparatus for indicating the preferences of an individual user with regard to information providing. For example, such customized attribute information might specify that priority is to be given to minimizing data communication costs (e.g., telephone charges) for the user, or that priority is to be given to providing the most complete and up-to-date information relating to a specific area of interest, such as a sport.

According to another basic aspect of the present invention, it discloses an information providing apparatus wherein the data editing means further comprises means which functions, when an updated set of the original information is received by the information providing apparatus, to compare the updated original information with a corresponding part of the first data stored in the data storage means of the information providing apparatus, to thereby derive any differences between the updated original information and stored first data as an updated part of the second data, and to store the updated part of the second data in the data storage means.

In that case, the information providing apparatus can further comprise means for transmitting the updated second data to the information receiving apparatus via the data transfer means, to be stored in the data storage means of the information receiving apparatus and so update the contents of the second data which are stored therein.

In that way, it is always possible for the information receiving apparatus to reconstitute any desired part of the original information by using only data which are currently stored at the information receiving apparatus, while ensuring that the reconstituted data will be up-to-date, and also ensuring that it is only necessary to transmit the minimum amount of data via the data transfer means in order to maintain such an up-to-date condition of the data stored at the information receiving apparatus.

Typically, the original information will consist of a plurality of respectively identified data items, each data item including identifier information and information expressing at least one attribute. In that case, updated original information that is received by the information providing apparatus will consist of either additional data items, or previously received data items for which one or more attributes have been altered.

The data editing means may obtain the first data from the original information by processing the original information during a predetermined initial processing period which extends over a plurality of successive updatings of the original information, to select attribute data which does not change througout the initial processing period, or which does not change by more than a predetermined amount during the initial processing period. To achieve this, the data editing means functions such that, when a set of updated original information is received by the information providing apparatus subsequent to the initial processing period, each data item of the set is compared with the first data which are already stored in the data storage means of the information providing apparatus, to thereby detect any changed data for at least one attribute of any of the data items, and to store the changed attribute data in the data storage means as updated second data.

If the original information consists of program broadcast schedule information, the data editing means may further comprise means for storing the broadcast schedule information in the data storage means of the information providing apparatus as program data records expressing broadcast information for respective programs. In that case, the first data are derived in the initial processing period as respective ones of the program records, each specifying a name of a program and attribute information including at least a starting time point and a duration of a broadcast of the program.

Furthermore the data editing means may further comprise means whereby, subsequent to the initial processing period, when a set of updated original information is received by the information providing apparatus, starting time point values for respective programs contained in the updated original information are compared with corresponding ones of the starting time point values which have been stored as the first data, and any difference between an updated starting time point for a program and a corresponding previously stored starting time point value is expressed as a positive or negative time increment value and is stored as part of the second data, in the data storage means of the information providing apparatus, as attribute information in conjunction with the name of the program in a program data record.

In that way, the program starting time point values which have been stored as part of the first data, at the end of the initial processing period, are thereafter used as framework data, i.e., as reference time points in each day or each week, with any subsequent changes in the starting time point of a broadcast of a program being specified with respect to a corresponding framework data time point.

The data editing means may further comprise means functioning subsequent to the initial processing period, when a set of updated original information is received by the information providing apparatus, to compare program names contained in the updated original information with program names contained in the first data which have been stored in the data storage means of the information providing apparatus, to thereby detect any new program name, and for storing each new program name and all corresponding attribute information contained in the updated original information, in the second data of the data storage means, as a new program data record.

BRIEF DESCRIPTION OF THE DRAWINGS

FIG. 3 is a table showing a partial example of a set of framework data utilized in the above embodiment;

FIG. 4 is a table showing a partial example of a set of variation data utilized in the above embodiment;

FIG. 5 is a table showing a partial example of a set of current program data utilized in the above embodiment, from which the variation data of FIG. 4 are derived based on the framework data of FIG. 3;

DESCRIPTION OF PREFERRED EMBODIMENTS

Figure 1:
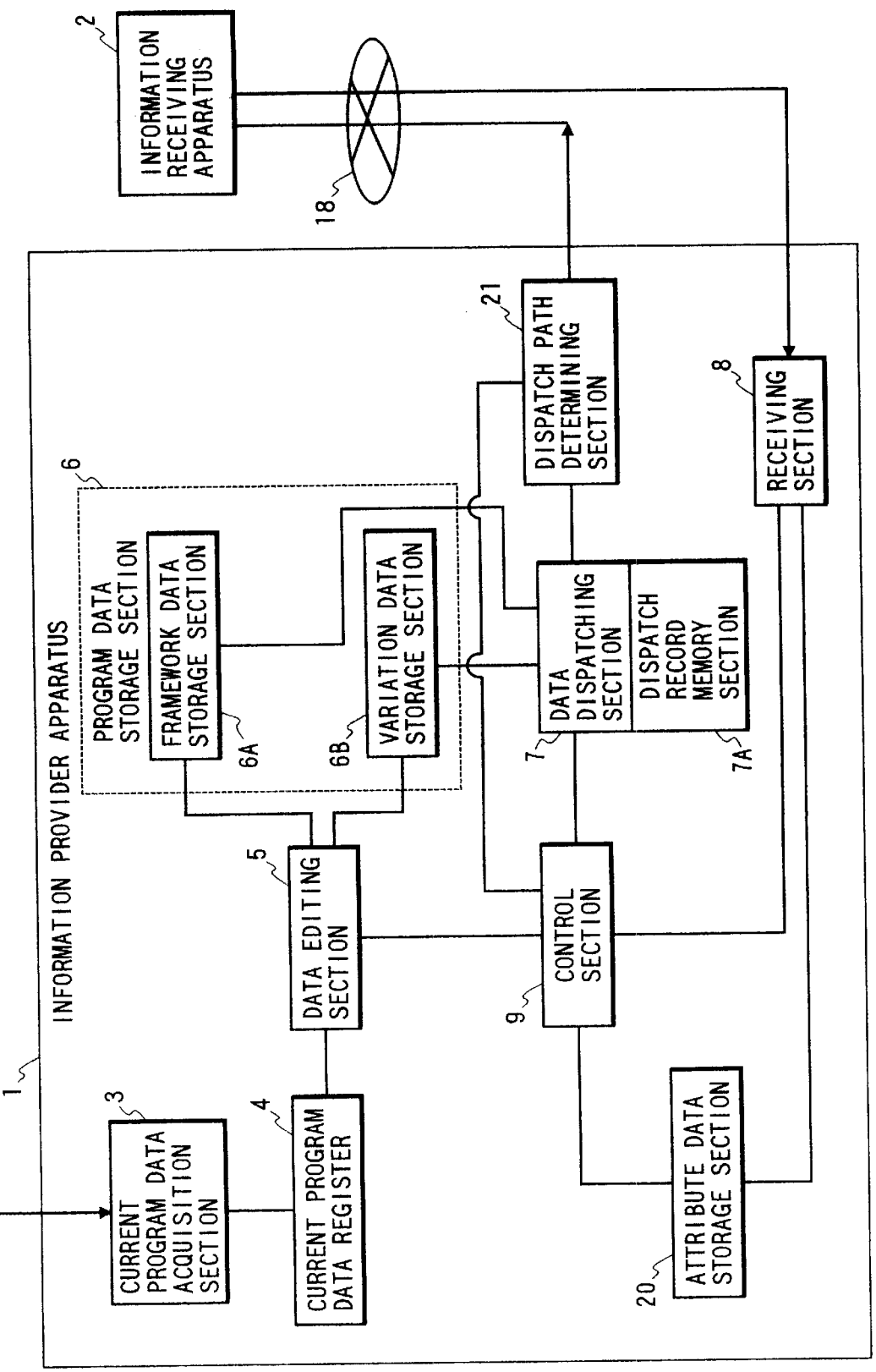
FIG. 1 is a system block diagram of an embodiment of an information providing system according to the present invention, showing details of the configuration of an information providing apparatus.

Embodiments of the present invention will be described in the following referring to the drawings. An embodiment of an information providing system will first be described, which will be assumed to consist of a single information providing apparatus and a plurality of information receiving apparatuses which can each communicate with the information providing apparatus via a communication network or other means for transferring data, with only one of the information receiving apparatuses being shown in the drawings and described. In the following embodiments, the aforementioned first data contain respective time point values which are utilized as a basic framework for timing reference purposes, and will be referred to as the framework data, while the aforementioned second data will be referred to as the variation data.

FIG. 1 is a block diagram showing the information providing system and an information providing apparatus connected to form the information providing system, with details of the information providing apparatus being shown. In FIG. 1, numeral 1 denotes the information providing apparatus, numeral 2 denotes an information receiving apparatus, and numeral 18 denotes means for transferring data between the information providing apparatus 1 and information receiving apparatus 2, which can be constituted in various ways such as a path via a data communication network such as the Internet, or via a television broadcasting network, and will be designated simply as the transmission path in the following description. However it should be understood that respectively different ways of implementing this transmission path 18 can be utilized for sending data from the information providing apparatus 1 to the information receiving apparatus 2 and for sending data in the opposite direction, or for sending respectively different types of data from the information providing apparatus 1 to the information receiving apparatus 2. In the information providing apparatus 1, a current program data acquisition section 3 serves to acquire original information from an external source (not shown in the drawings). It will be assumed that the function of this information providing system embodiment is to supply to each information receiving apparatus, in response to requests which are transmitted from an information receiving apparatus 2 to the information providing apparatus 1, information consisting of television program schedule data. In the following, the television program schedule data which constitute the original information for such an information providing system will be referred to as the current program data.

To avoid confusion, it should be understood that unless otherwise stated, the term "program" is used herein only in the sense of a broadcast program, such as a news program or a motion picture for example. That is to say, the current program data consists of a set of data items each consisting of a program name and information concerning a plurality of attributes for a broadcast of the program, including at least the starting time point and duration (or ending time point) of the broadcast. Such current program data are periodically updated, for example once in each week. Numeral 4 denotes a current program data register for temporarily holding current program data which are acquired by the current program data acquisition section 3. 5 denotes a data editing section, one of whose functions is that of editing the current program data obtained by the current program data acquisition section 3 to separate the current program data into the aforementioned framework data and variation data, and to thereafter update the stored variation data whenever an updated set of current program data are acquired, and also to selectively read out data from a program data storage section 6 when it becomes necessary to transmit such data to an information receiving apparatus. The data storage section 6 stores the framework data and variation data which are produced by the data editing section 5. A data dispatching section 7 executes processing for dispatching data to the information receiving apparatus 2 when required. A receiving section 8 receives data transmission requests which are sent from the information receiving apparatus 2. A control section 9 executes overall control of the respective processing performed by the data editing section 5 and the data dispatching section 7, etc., and is preferably implemented as a programed microprocessor.

The data storage section 6 is made up of a framework data storage section 6A for holding the framework data and a variation data storage section 6B which holds the variation data. Each time that processing is executed to transmit program data (framework data and/or variation data) to the information receiving apparatus 2, the data dispatching section 7 stores a corresponding dispatch record, in a dispatch record storage section 7a. That is to say, the data dispatching section 7 maintains records which express the current status of updating of the program data which are being held at the information receiving apparatus 2. The information providing apparatus 1 further includes an attribute data storage section 20, and a dispatch path determining section 21, which are respectively described hereinafter.

Figure 2:
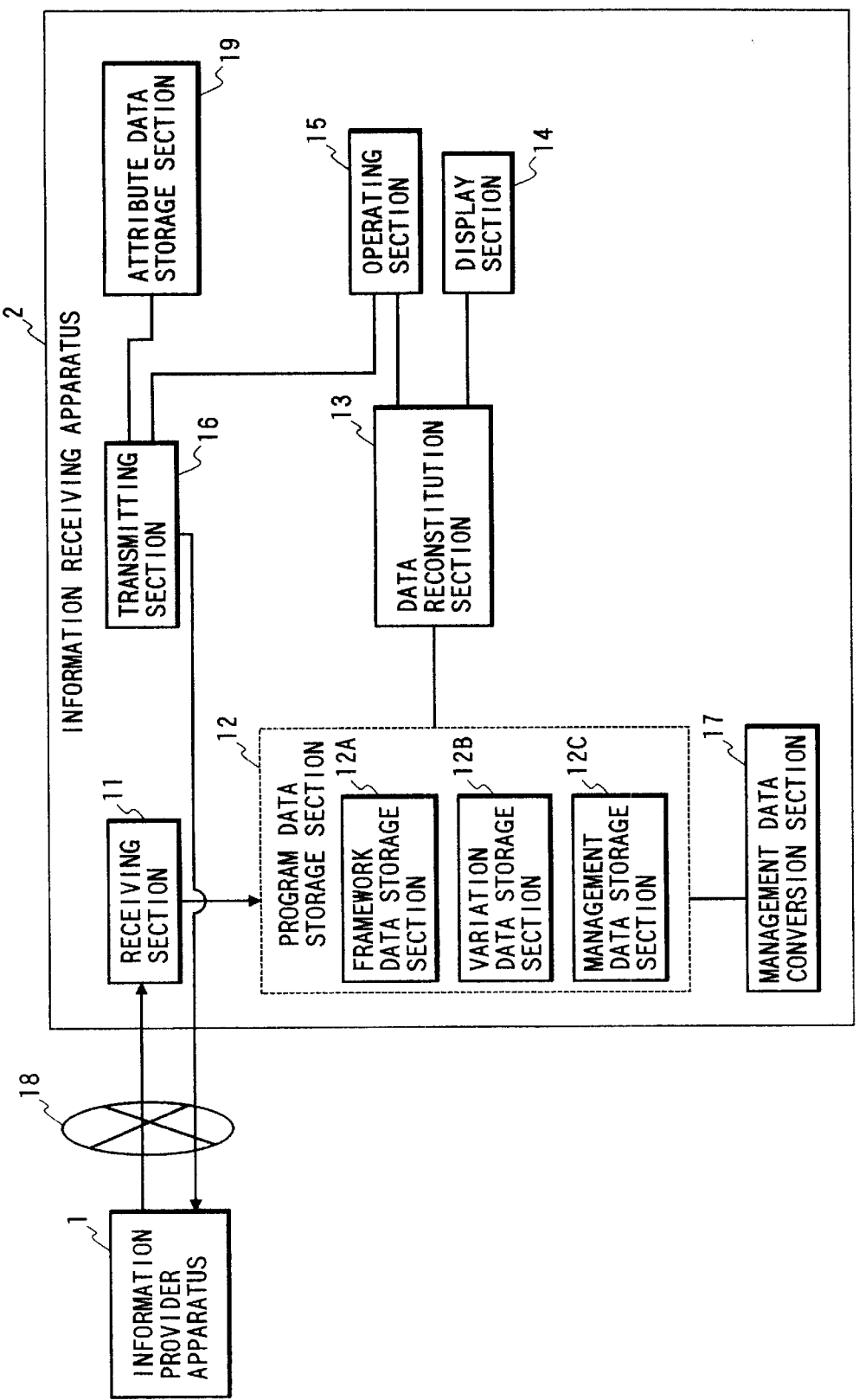
FIG. 2 is a system block diagram of the system of FIG. 1, showing details of the configuration of an information receiving apparatus.

FIG. 2 is a block diagram showing details of the information receiving apparatus 2 of the system of FIG. 1. Numeral 11 denotes an information receiving section, which functions as an interface for receiving data which are dispatched to that information receiving apparatus 2 from the information provider apparatus 1, while a data storage section 12 holds the received data. A data reconstitution section 13 operates on selected parts of the framework data and variation data which are held in the program data storage section 12, to reconstitute desired parts of the aforementioned current program data, when required. A display section 14 displays data which are reconstituted by the data reconstitution section 13. It should be understood that the term "display" as applied to the functions of the display section 14 is intended to broadly cover the general concept of outputting data to a user, e.g., as visible displayed characters and graphics, and/or audible output. An operating section 15 is configured to be manually operable by a user for inputting data or commands to the system, such as information display requests. A transmission section 16 serves to transmit such commands to the information providing apparatus 1 via the transmission path 18.

The data storage section 12 consists of a framework data storage section 12A, for holding the framework data which are also stored at the information providing apparatus, a variation data storage section 12B for holding at least a part of the variation data which are currently stored at the information providing apparatus, and a management data storage section 12C for holding management data used in managing the contents of the framework data holding section 12A and the variation data holding section 12B. The data storage section 12 is connected to a management data conversion section 17, for altering the management data for the framework data storage section 12A and variation data storage section 12B in accordance with whether framework data or variation data are received from the information providing apparatus 1. The information provider apparatus 1 and the information receiving apparatus 2 are connected via the transmission path 18, which can for example consist of a path through a communication network such as the Internet, to form the overall information providing system. Alternatively, the transmission path 18 may be formed by using a network formed of dedicated lines or a public telephone system, or may be implemented in a terrestrial radio television broadcasting system, a satellite television broadcasting system, etc. In the case of using such a broadcasting system, data can for example be dispatched to users by inserting character data into the vertical blanking intervals of the television signal. As a further alternative, the transmission path 18 could be implemented by means of transportable data storage media such as optical disks, magnetic disks, etc, or a combination of such a method with any of the preceding methods.

The information receiving apparatus 2 is further provided with an attribute information holding section 19, for storing attribute information relating to that apparatus and attribute information relating to the user of that apparatus. That is to say, the attribute information holding section 19 stores attributes of the information receiving apparatus 2 itself (for example, capability of receiving HTML data, capability of full color display operation, sizes of various data storage regions, level of computing performance, types of media which are connected, whether the power source for the apparatus is continuously held in the ON state, whether a clock/calender function is incorporated, etc.), user attributes (for example, age, sex, occupation, address, place of origin, family structure, etc., interests, magazines read, preferred foods, frequently accessed data display pages, etc.), operational features, etc., and may also hold information relating to requests (for example, whether requests are frequently sent from that apparatus, whether similar requests are always sent, etc). After having been input by the user through the operating section 15 and stored in the attribute data storage section, such data may be read out and transmitted via the transmission path 18 by the transmission section 16 in response to commands which are input by the user from the operating section 15, or the information provider apparatus may configured such that the attribute data are read out and attached to the contents of a request for program data which is input by a user, when these contents are transmitted to the information provider apparatus.

When such attribute data are received from the information receiving apparatus 2, the information provider apparatus 1 stores the attribute data in the attribute information storage section 20.

It is a basic feature of the present invention that respectively different types of data, i.e., the framework data and the variation data, may be dispatched to a user via respectively different transmission paths. For example, the framework data might be dispatched via the Internet, while the variation data might be dispatched via a television broadcasting system. Alternatively, the transmission path 18 which is used to dispatch data from the information providing apparatus 1 to an information receiving apparatus 2 may be determined in accordance with the attributes of that particular information receiving apparatus 2. This feature is controlled by the dispatch path determining section 21 of the information providing apparatus 1, which serves to determine the respective transmission paths 18 of the different types of data held in the data storage section 6, based on the apparatus attribute information for the information receiving apparatus, and/or the type of data (framework data or variation data) that are to be transmitted.

It should be noted that it would be equally possible to form the attribute information storage section 19 and attribute information storage section 20 within the data storage sections 6 and 12 of the information provider apparatus 1 and information receiving apparatus 2, respectively.

Since the information receiving apparatus 2 includes the framework data holding section 12A, variation data storage section 12B and management data storage section 12C, with the data reconstitution section 13 and operating section 15 being formed respectively separately, the display method and the operating method can each be changed, to be appropriate for a particular configuration of information receiving apparatus or the requirements of a particular user. As examples of switching the display method, it is possible to change the number of broadcast channels which are listed in one display page, or change the number of characters used to display information concerning a program, or change the character colors or the background pattern for the displayed data. As examples of switching the operating method, when data are displayed in HTML form it is possible to change the number and arrangement of the displayed buttons used for HTML control, or to change the operations which are performed when displayed buttons are actuated by the user, or to change an information source which can be selected by actuating a specific button.

As an actual example, the embodiment can be configured such that a user of the information receiving apparatus 2 can select from a menu of "viewing modes" the viewing mode which is most suited to that user. The menu contents could be arranged in a manner similar to that of a newspaper television program schedule (with such an arrangement being suitable for users who are not yet familiar with using the system), or the menu contents could be arranged as a list of items, starting from a leading item (with such an arrangement being suitable for obtaining sufficient speed of operation, in the case of a type of receiving apparatus which does not have a high level of performance).

With this embodiment, information specifying the display method and the operating method which are currently selected for use by the information receiving apparatus 2 are also sent to the information provider apparatus 1 and stored in the attribute data storage section 20 as part of the apparatus attribute information, thereby enabling the information provider apparatus 1 to match the mode in which it generates data which are to be sent to the information receiving apparatus 2 to the display method and operating method which are currently selected for use by that information receiving apparatus 2. More specifically, data expressing the the display method and operating method which are currently selected by the user are stored in a region of the attribute data storage section 19, and updated whenever a change is made in any of that information. Each time that such a change is made, the updated data are transmitted by the transmitting section 16 to the information providing apparatus 1, and stored in a region of the attribute data storage section 20, to be available to the control section 9 of the information providing apparatus 1 in the same way as for the other types of apparatus attribute data which are held in the attribute data storage section 20.

The overall operation of this information providing system will now be described. As mentioned above, it will be assumed that the system provides television program schedule information (referred to in the following simply as program information) using a communication network such as the Internet for implementing the transmission path 18, and that the information provider apparatus 1 acquires an updated set of current program data at regular periods from a source of program information. Typically, such a set of current program data will consist of complete program schedule data for each of a plurality of television channels for the duration of a succeeding week, however the embodiment is not limited to such regular acquisition of current program data. When updated current program data are acquired by the current program data acquisition section 3, the data are temporarily stored in the current program data register section 4. The current program data acquisition section 3 may for example obtain the current program data from an apparatus which scans and analyzes printed data to thereby generate the current program data, or from a program database distribution apparatus. The current program data will include various types of data including television channel numbers, program names, starting times and durations of program broadcasts, performer names, brief descriptions of program contents, and/or other program attributes (for example, information specifying that a program is a sports program, a drama program, etc., whether the a program is a special program, etc.).

In order to obtain the framework data which are to be stored in the framework data storage section 6A, an initial operation of separation processing is applied to successive sets of current program data which are written into the current program data register 4, over a substantially long initial processing period, for example over a period of 2 months, or 6 months. Various types of selection conditions could be envisaged for selecting the framework data. It will be assumed in the following that with this embodiment of the invention, the framework data are selected as those parts of the current program data which display no change or no more than a predetermined amount of change, throughout the initial processing period. Alternatively, the framework data can be selected as those parts of the current program data which are changed no more than a predetermined number of times throughout the initial processing period (since for example a television program schedule may be temporarily altered due to special circumstances).

Once the framework data have been established and stored, the variation data can be obtained as data which satisfies the definition "those parts of the current program data which do not form part of the framework data". Thus the variation data are first obtained (and thereafter successively updated each time that current program data are newly acquired) by comparing the most recently acquired current program data with the framework data, to find all program data which meet the above condition.

When the current program data consist of broadcast television program schedule data, then the framework data will in general be selected as information relating to each program which is broadcast at a fixed time on a fixed day of each week throughout the initial processing period. It will further be assumed that the time points (within each broadcast day) at which such programs nominally should begin are utilized as basic reference time points, although as indicated above the actual starting time point and/or duration of any program may be temporarily altered, for example due to the need to broadcast a special new report. More specifically, each program broadcast for which there is a framework data record has a nominally fixed starting time point and broadcast duration, and is identified by a fixedly assigned program name, however in principle, any attribute (including the starting time point, program duration, etc.) may change, from broadcast to broadcast. Thus in the case of program which is broadcast at a (nominally) fixed time on a specific television channel on one specific day of each week, the starting time point of that program will be stored in the framework data storage section 6A in a framework data record, in conjunction with the program name, and any other attributes of that program which have been established as part of the framework data. If any changes subsequently occur in these attributes, then information expressing such changes will be stored in the variation data storage section 6B as a variation data record for that program.

The variation data will in general consist of program schedule data which change from week to week, such as information concerning special programs, programs which are broadcast only once or for a small number of times, or information concerning specific performances of a regular program (for example, the title of a movie and names of the actors, for a performance of a regular weekly motion picture program). In the latter example, the starting time and the name of the program might be stored as framework data in the framework data storage section 6A, while the other attributes would be held as variation data in the variation data storage section 6B and would be updated each week.

Furthermore, it is possible to divide the variation data into a number of separate levels which are handled and stored as respectively different data categories, for example a level of variation data (such as performance titles, names of actors, etc.) for programs which are broadcast regularly each day or each week, and a level of variation data for special (temporary) programs. In that case, the variation data storage section 6B would be configured as a plurality of sections in accordance with the classification levels, with the internal storage region of the variation data storage section 6B divided into a plurality of sub-regions.

Various methods could be envisaged for the data editing section 5 to process the current program data for extracting the framework data, during the initial processing period. This can be done for example by comparing the bits of the current program data for a program during one week with the bits which express the corresponding current program data for that program during the succeeding week, to thereby extract the differences, or by analyzing the data structures of the program information to obtain these differences.

With this embodiment the data editing section 5 operates, in response to a request for program data sent from a user, to selectively determine the data which are actually dispatched in accordance with the particular attributes of that user and/or of the information receiving apparatus which is being employed by that user. Such editing operation is performed by the data editing section 5 based on the information which is stored in the attribute data storage section 20, i.e., the information specifying the apparatus attributes and the user attributes. In that case, the appropriate attribute information (all or part of the attribute information for that specific user and for the information receiving apparatus which is employed by that user) is read out from the attribute information storage section 20, and, based on that information, the data editing section 5 judges how to select appropriate program data to be dispatched to the user. For example it might be found, in the case of a particular information receiving apparatus, that the user characteristics (as set out in the contents of the attribute data storage section 20) are: "the user is a male, aged 45", and the system may function such that detailed information will be provided on business-related programs in the case of such a user. Alternatively, if the requesting user is a young female college student, then the data editing section 5 might give priority to providing detailed information relating to programs which are popular among such students.

In addition to such selection of the type and degree of detail of program data which will be sent to users by the information receiving apparatus, the data editing section 5 can also dispatch display-related information together with the program data, for modifying the overall configuration of the display picture (i.e., display page) which will be generated by the display section 14 of the information receiving apparatus when displaying the received program data, to modify the display picture in a predetermined manner in accordance with the attributes of the requesting user.

In addition, the data editing section 5 can be configured to perform editing of the program data that are dispatched to a user in accordance with specific information which is requested by a user. For example, additional detailed program information concerning a specific performer can be dispatched, in response to such a request from a user, by reading out the appropriate program attribute information from the program data storage section 6.

Furthermore, the data editing section 5 can be configured such that, if it is determined from the contents of the attribute data storage section 20 that the apparatus attributes of the information receiving apparatus 2 indicate that this is an apparatus having only a low level of performance capability, then the data editing section 5 will edit the program data which will be sent to that information receiving apparatus such as to contain data having only a small amount of display content, whereas if the apparatus attribute information indicates that the information receiving apparatus 2 is capable of high performance, then program information that has been be edited such as to be rich in display content will be sent.

As a further alternative, the data editing section 5 can be configured such that time data for use in updating a clock/calendar function of the information receiving apparatus 2 are periodically dispatched from the information providing apparatus 1 to the information receiving apparatus 2, if the apparatus attributes of that information receiving apparatus indicate that it includes a clock/calendar function.

With the embodiment described above, the system can store user attribute information, and use that information when selecting program data which are to be transmitted from the information providing apparatus to the information receiving apparatus of the user. In that case, the system itself makes assumptions concerning the probable preferences of the user, based on the user attribute information. However a modification of the above embodiment is possible, whereby information can be acquired and stored by the system, which indicates individual preferences of respective users as specified by the users themselves, i.e., customized user attribute data. This will be referred to in the following simply as the customized data. This is also stored in the attribute data storage section 20. In that case, the control section 9 is configured to modify the process of program data selection and transmission path selection, when responding to a request from a user, in accordance with the customized data for that specific user. For example, users for which respectively different sets of customized data could be established might be as follows:

Type A User: (Places Importance on Communication Costs)

The customized data for this user specify that transmitted program data must be selected such as to minimize the amount of telephone charges for the user. In addition, down-loading of program data to the information receiving apparatus 2 from the information providing apparatus 1 is to be initiated (as far as possible) by the information providing apparatus 1 itself, to thereby minimize the need for the user to transmit requests to the information providing apparatus. Also, in order to further reduce costs to the user, advertisements may be inserted into the information which is provided to the user.

Type B User: (Places Importance on Receiving Up-to-date Information)

Importance is to be given to data being up-to-date. Dispatching of updating program data to the user is to be performed at the initiative of the information provider apparatus 1 itself (each time that updated current program data are acquired by the information providing apparatus).

Type C User: (Directed Towards Specific Objectives)

Priority is to be given to providing information for which various characteristics have been specified by the user, concerning types of program, broadcast dates, broadcast time ranges, performers, etc.

Thus by using such customized data in that way, the system can effectively satisfy the requirements of individual users, by selecting appropriate types and/or degree of detail of program data which are to be transmitted to a user, and also appropriate forms of communication path for transmitting program data to the respective users, frequency of updating the program data which are stored at a user's information receiving apparatus, etc.

To assign a set of customized data to a particular user, the user must beforehand input some preference information, via the operating section 15 of the information receiving apparatus 2 to be transmitted to the information providing apparatus 1 so that corresponding customized data for that user will be stored in the attribute data storage section 20. Since various arrangements can easily be envisaged whereby the system prompts the user for such information, detailed description will be omitted.

Once such a set of customized data has been acquired for a user, the data editing section will thereafter modify the selection of program data that are transmitted to the information receiving apparatus of that user, in accordance with the contents of the customized data, for example by transmitting especially detailed information concerning certain types of program each time that the user inputs a request for program information.

After completion of the aforementioned initial processing period, with the framework data and variation data having been respectively stored in the data storage section 6 of the information providing apparatus 1, dispatching of data from the information providing apparatus 1 to the information receiving apparatus 2 is performed as follows. Firstly, when the user inputs to the information receiving apparatus 2 a request for display of specific program schedule information, then it is necessary to ensure that this information will be derived on the basis of currently valid current program data. It will first be assumed that with this embodiment, when updated current program data are acquired by the information providing apparatus 1 and the variation data held in the variation data storage section 6B are updated accordingly, updating data are not sent automatically to the information receiving apparatus 2, for updating the variation data held in the variation data storage section 12B. For that reason, when such a request for display of specific program data is input by the user to the information receiving apparatus 2, the contents of that request are transmitted as a data dispatch request by the transmission section 16 via the transmission path 18, to the receiving section 8 of the information providing apparatus 1.

The system may be configured such that at that time, the transmission section 16 transmits the aforementioned attribute information concerning the information receiving apparatus 2 itself, and/or user attribute information, attached to such a data dispatch request. Alternatively, the system may be configured such that attribute information are transmitted by the information receiving apparatus to the information providing apparatus in response to a command specifying such information transfer, input by the user from the operating section 15.

When the data dispatch request reaches the receiving section 8 of the information providing apparatus 1, the control section 9 notifies the data dispatching section 7, specifying the particular program data that have been requested. The contents of the request might for example specify "the complete day's schedule for television channel 10, on May 21", or "title of motion picture which will be played as the Movie of the Week program on 22 August". When the data dispatching section 7 receives such a notification, the dispatch record storage section 7a is first searched, to examine the program information which has been already dispatched to the requesting information receiving apparatus. The updating status of the data currently held in the program data storage section 12 of the information receiving apparatus, in relation to the data currently held in the program data storage section 6 of the information providing apparatus, is thereby obtained. If it is found, as a result, that any data which are necessary for reconstituting the requested program data have not yet been sent to that user (i.e., up-to-date variation data relating to the requested program data are not yet stored at the requesting information receiving apparatus), then such remaining variation data are read out from the framework data storage section 6, and sent via the transmission path 18 to the information receiving apparatus 2. In addition, the dispatch record data for that information receiving apparatus 2, held in the dispatch record memory section 7A, are updated accordingly.

The data reconstitution section 13 of the information receiving apparatus 2 then reconstitutes the requested program data, after reading out the appropriate framework data and variation data records from the program data storage section 12.

If on the other hand it is found by the information providing apparatus that all data which are necessary for reconstituting the requested program data have user have already been sent to that information receiving apparatus 2, then the data dispatching section 7 generates only a message which is dispatched to the information receiving apparatus 2 via the transmission path 18, notifying that no updating of the contents of the program data storage section 12 is necessary in order to reconstitute the requested program data. The information receiving apparatus 2 then reconstitutes the requested program data, using the framework data and variation data which are already stored in the program data storage section 12.

Each time that program data are to be transmitted by the information provider apparatus 1, the control section 9 reads out apparatus attribute information relating to the requesting information receiving apparatus 2 from the attribute information storage section 20, and in addition, investigates the type of the program data which are to be transmitted, i.e., framework data or variation data. Based on the combination of information thereby obtained, the control section 9 generates appropriate control signals for controlling the dispatch path determining section 21 to select the particular transmission path (or paths) which is to be used as the transmission path 18 for dispatching the program data. In response to these control signals, the dispatch path determining section 21 establishes the appropriate transmission path (or paths) 18 via which the data will be transmitted. The transmission path 18 can be implemented in one or a combination of the ways described hereinabove, via a network such as the Internet, etc.

If it is found necessary as described above for the information providing apparatus 1 to transmit updated variation data to an information receiving apparatus 2 in response to a request for program information from that information receiving apparatus 2, then when the dispatched variation data reach the receiving section 11 of the information receiving apparatus 2 they are stored in the variation data storage section 12B, thereby updating a part of the contents.

In that way, requests from a user for program information can be satisfied while minimizing the amount of data which must be transmitted via the transmission path 18, thereby reducing the amount of communication time that is required to meet such a request, and so lowering the communication costs.

Furthermore, since as noted above it will generally only be necessary to dispatch a part of the variation data from the information providing apparatus 1 to the information receiving apparatus 2 in order to satisfy such a user request (since the framework data will in general remain constant over a long period of time) it is normally only necessary for the data held in the variation data storage section 12B of the information receiving apparatus 2 to be altered, so that the overall data processing operation is simplified.

As well as receiving the framework data and variation data and storing these in the data storage section 12, the information receiving apparatus 2 generates management data which are held in the management data storage section 12C and used; for example, in linking together data of the same type (i.e., variation data or framework data) during processing that is executed by the data reconstitution section 13 to reconstitute program data by using selected parts of the framework data and variation data held in the program data storage section 12. The contents of the management data storage section 12C are modified by the management data conversion section 17 when necessary. For example in the case in which only variation data, read out from the variation data storage section 6B, are dispatched to the information receiving apparatus 2 and used to update the contents of the variation data storage section 12B, the management data conversion section 17 performs appropriate conversion processing of the data held in the management data storage section 12C in accordance with the changes which are made in the variation data stored in the variation data storage section 12B.

When the user inputs a request for display of specific program information, via the operating section 15, then after any necessary data have been transferred from the information providing apparatus 1 to update the contents of the program data storage section 12 as described above, the data reconstitution section 13 reads out, from the data storage section 12, requisite parts of the stored framework data, variation data and management data, and operates on the framework data and variation data in accordance with the management data to reconstitute the required program data in a form suitable for display to the user. For example, the resultant reconstituted program data might be in the form of a page of HTML data. The program data thus produced are then sent to the display section 14, to be displayed to the user.

It can thus be understood that it is a further basic advantage of the present invention that it becomes unnecessary for the information providing apparatus to transmit to the information receiving apparatus any data which has been arranged in a special structure for the purposes of display, such as a number of HTML pages which are connected by hyperlinks. All of such processing can be performed at the information receiving apparatus, operating on the program data which are stored in the data storage section 12. The amount of data which must be transmitted to each information receiving apparatus can thereby be substantially reduced.

It has been assumed in the above description that the framework data and variation data are mutually separated, in the information providing apparatus 1, in accordance with whether or not program data regularly occur within the current program data over suitably a long period of time, such as several weeks, for example in accordance with whether the same program (e.g., having the same name) is scheduled to be broadcast at the same time of day on the same day of the week throughout such a long period of time. However an alternative method of separating the framework data and variation data, for use with another embodiment of the invention, is as follows. During the initial processing period, the acquired current program data are held in a single storage section. When a request for display of program data is input to an information receiving apparatus, the request is transmitted to the information providing apparatus, which then reads out the requested data from the single storage section and transmits the program data to the information receiving apparatus. During the initial processing period, the date editing section 5 monitors these transmissions of program data, to record, for each program, the number of times that data relating to the program are transmitted to information receiving apparatuses, to thereby obtain the average frequency at which such transmissions occur during the initial processing period. The framework data are then selected as the data (i.e., information for specific broadcast attributes of specific programs) for which that frequency of transmissions exceeds a predetermined value, with the remaining parts of the current program data becoming the variation data. The framework data thus selected are then stored in the framework data storage section 6A, and the (initial) variation data are stored in the variation data storage section 6B, and are also transmitted to each information receiving apparatus, to be stored in the framework data storage section 12A and variation data storage section 12B respectively.

Thereafter, the operation of such an embodiment is identical to that described for the previous embodiment. It will be apparent that such an embodiment can provide similar effects to those described for the preceding embodiment, by minimizing the amount of program data which must be transmitted to information receiving apparatuses in order to respond to requests from users.

In general, the framework data will include at least the following type of data:

(1) The name, and attribute data including at least the starting time point and duration of a broadcast (or starting time point and ending time point) of each regularly broadcast program, e.g. which is broadcast at the same time on the same day of each week.

Similarly, the variation data will generally include at least:

(1) For each program having a framework data record and also a variation data record, the program name and attribute data. The attribute data may consist of data for altering the starting time point and/or duration of one or more of the regular programs, i.e. as displacement amounts with respect to values which are specified in the framework data. Such variation data will be generated whenever a change occurs in the program schedule, as conveyed by the current program data, after the framework data have first been generated and stored. The attribute data may also include for example the names of performers who will appear in one specific occurrence of a regular program, the title of that performance (such as the title of a motion picture), etc.

(2) For each new program (i.e., a program for which no record exists in the framework data), the program name and all attribute information for that program.

The framework data and variation data may be stored in the form of respective tables, with a program data record for a program consisting of one row of such a table. An example of part of such a table, in the case of the framework data, is shown in FIG. 3. In that example and in the following description it will be assumed that, once the framework data have been generated as described hereinabove and stored in the framework data storage section 6A, the starting time points which are listed in the framework data are utilized as fixed reference time points (until the next time that the framework data are newly generated and stored). That is to say the starting time point and ending time point of any program are each defined in relation to respective starting time points which are listed in the framework data, irrespective of whether the program is a regular program whose actual starting time point and/or duration has been temporarily or permanently changed.

The above can be more clearly understood by referring to the partial example of a set of framework data records which shown in FIG. 3, and the corresponding example of a set of variation data records which is shown in FIG. 4. In the table of FIG. 3 it is assumed that broadcasts of four of the regular programs start at the respective time points 04:30, 20:00, 22:00 and 22:30 on each Monday, with respective durations of 60 minutes, 120, 30 minutes and 60 minutes, and are identified by the respective program names shown in the table. In the table of FIG. 4, it is assumed that in the current condition of the variation data held in the variation data storage section 6B of the information providing apparatus 1, the broadcast duration of one program (named "Monday Night Movie") has been increased by 15 minutes, and as a result, the starting time point of the succeeding program ("News Summary") has been correspondingly delayed by 15 minutes, to 22:15, while its duration has been reduced by 15 minutes. In addition, the title which is assigned to the performance of the program "Monday Night Movie" is contained in the variation data record for that program as "Lost Horizon".

It can thus be understood that, with this simple example, the data reconstitution section 13 can correctly reconstitute correctly updated program information for Monday, 12 November by combining the relevant parts of the variation data and framework data held in the program data storage section 12, with priority being given to the variation data.

More specifically, when reconstituting the program data for a specific broadcast, if it is found that a corresponding variation data record exists, then each attribute contained in that variation data record is used in generating the resultant final (reconstituted) data record, together with any data item that is contained in the corresponding framework data record but not in the variation data record for that program.

The way in which the framework data are variation data are respectively generated and utilized, in the case of providing program data, will be described in greater detail in the following, again using the table examples of FIG. 3, FIG. 4, and FIG. 5. It will be assumed in the following that the framework data and variation data are handled as respective sets of data each applying to a television broadcast schedule for one complete day of the week, for one television channel. Such a daily data set will be referred to in the following as a program data unit. The leftmost column of table 3 is a list of framework data time points, with the first of these specifying the starting time point of the first program of the day, and with each row (record) of the table expressing attributes of the program which is assigned the corresponding framework data time point as its starting time point. It will be assumed that the duration of each program rather than the program end time point will be specified in the framework data, however either of these could be used. Only the "program duration" and "program name" attributes are shown, however various other attributes might be entered for certain programs.

A corresponding variation data example for that same program data unit is shown in the table of FIG. 4. A record corresponding to a program will appear in such a variation data table if:

(a) There is a record for that program in the framework data, and it has been found that there is a change or addition of any attribute for that program, or (b) The program has been newly added, so that there is no corresponding record in the framework data. In this example, it is assumed that the following changes have occurred, relative to the framework data:

(1) The duration of one program (named "Monday Night Movie") has been changed (extended), and an attribute has been added (i.e., title of performance).

(2) The starting time point of the succeeding program has been changed (delayed), and the duration of that program has been changed (shortened).

(3) A new program has been inserted ("Evening Talk Show"). In this case, the variation data record contains all of the attributes of that program, including the starting time point.

Such information constitutes the updated variation data that are stored in the variation data storage section 6B of the information providing apparatus 1 when updating has been performed by the data editing section 5 based on newly acquired current program data for a program data unit. FIG. 5 shows an example of the current program data which could result in the variation data of FIG. 4, based on the framework data of FIG. 3. It will be apparent that the information shown in FIG. 5 can be reconstituted by combining the framework data of FIG. 3 with the variation data of FIG. 4, by assigning priority to each data element of the variation data.

It should be noted that a new program such as "Evening Talk Show" might have a starting time point which is not a framework data time point, for example 22:45. In that case, the starting time point could be fixed with respect to the framework data by again using 22:30 as the "starting time point" entry, but inserting the value "+15" in the "starting time point change amount" entry for that program. This would ensure that all variation data time information can be specified with reference to the framework data time points.

Figure 6:
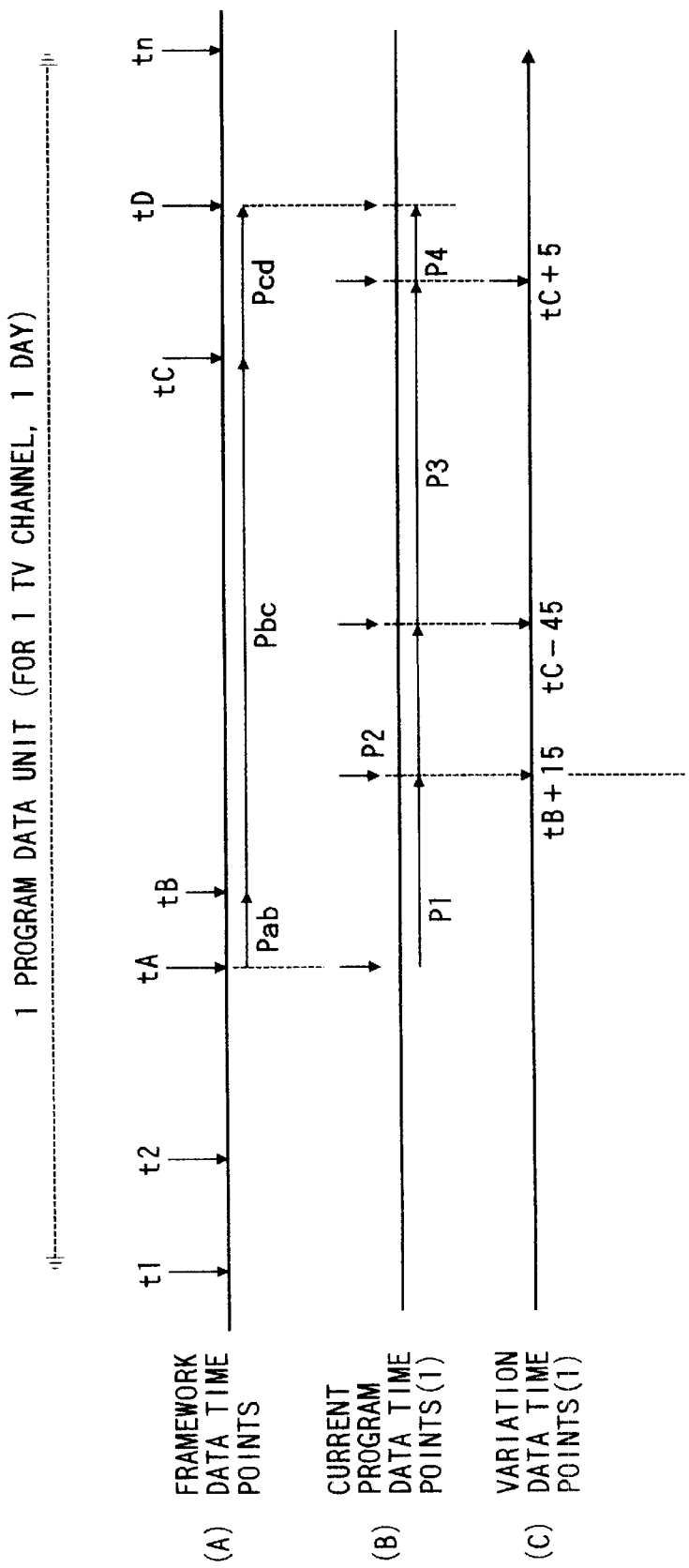
FIG. 6 is a conceptual diagram for illustrating the relationship between framework data, newly acquired current program data, and the resultant variation data, for one program data unit (the program schedule data of one television channel for one day)

The way in which the time points of the framework data are used for updating the variation data can be readily understood by referring to the timing examples shown in FIG. 6. Here, diagram (A) conceptually illustrates an example of a sequence of framework data time points for a program data unit which extends from an initial time point t1 (the starting time point of the first program of the day) to tn (the end time point of the final program of the day). In the original framework data, three programs Pab, Pbc and Pcd respectively extend from time points tA to tB, from tB to tC and from tC to tD. It is assumed that subsequently, when a first set of variation data are generated for that program data unit, the only differences between the current program data and the framework data (with respect to time points) is that a program (P1) now extends from tA to point that follows tB by 15 minutes, i.e., to (tA+15), a program P2 extends from (tA+15) to a point which occurs prior to tC by 45 minutes, i.e., (tC −45), and a program P3 extends from (tC−45) to a point which occurs after tC by 5 minutes, i.e., (tC+5), and ends at time point tD. Thus in this example, the starting time point of program P2 is keyed to the framework data time point tB, whereas that of program P3 is keyed to the framework data time point tC. In addition, variation data starting time points for two programs (P3 and P4) are now keyed to the same framework data time point, tC.

As a result, whereas the framework data contains the sequence of program starting time points tA, tB, tC, tD, the variation data contains the sequence of starting time points (tB+15), (tC−45), and (tC+5).

If any of the programs P1, P2, P3, P4 is a new program, then a record containing the starting time point and complete attribute information will be entered into the variation data for each such program, as described above. However if for example the program P3 is actually the program Pcd, with the starting time point advanced and the program duration increased, then a corresponding record will appear in the variation data, specifying that change in starting time point (as −45 minutes), and the change in duration.

As can be understood from FIG. 6, it is possible to generate variation data for a program data unit based on a complete set of current program data for that program data unit (i.e., for one day), or on current program data which covers only a part of a day. For example, if the current program data consists of only inf concerning the programs P1, P2, P3, P4 of FIG. 6, then that can be used to generate or update only the the requisite variation data records. It is only necessary in such a case to ensure that the total time interval occupied by a program or a sequence of programs to which a change in start time or duration has been applied, or in which a new program has been inserted, will coincide with an interval defined by framework data time points (such as the interval from tA to tD in FIG. 6).

The framework data for a program data unit can be generated as follows, by operating upon the current program data for sequential pairs of program data units, i.e., data for the same television channel on the same weekday in sequential pairs of successive weeks, over a sufficiently long comparison period, such as two months or half a year. First, the current program data for each program occurring in the first week are compared with those for programs occurring in the second week, to detect each recurrence of the same program (i.e., a program having the same name, and same start and end time points). Such a program will be referred to as a candidate framework data program. In addition, for each such candidate framework data program, recurrence of the same attributes is also detected. The resultant information for each candidate framework data program is then stored, and the process is then repeated for program data of the second and third weeks, to obtain a second set of candidate framework data programs, and such processing is thereafter repeated for successive pairs of weeks.

At the end of the comparison period, the attribute data of the various candidate programs are compared, to find those programs (and any attributes of these programs) which recur unchanged throughout the comparison period, or which recur unchanged by more than a predetermined minimum number of times. It will be apparent that the framework data for a program data unit can be readily obtained in that way, by a simple process of data collation, so that detailed description will be omitted.

Figure 7:
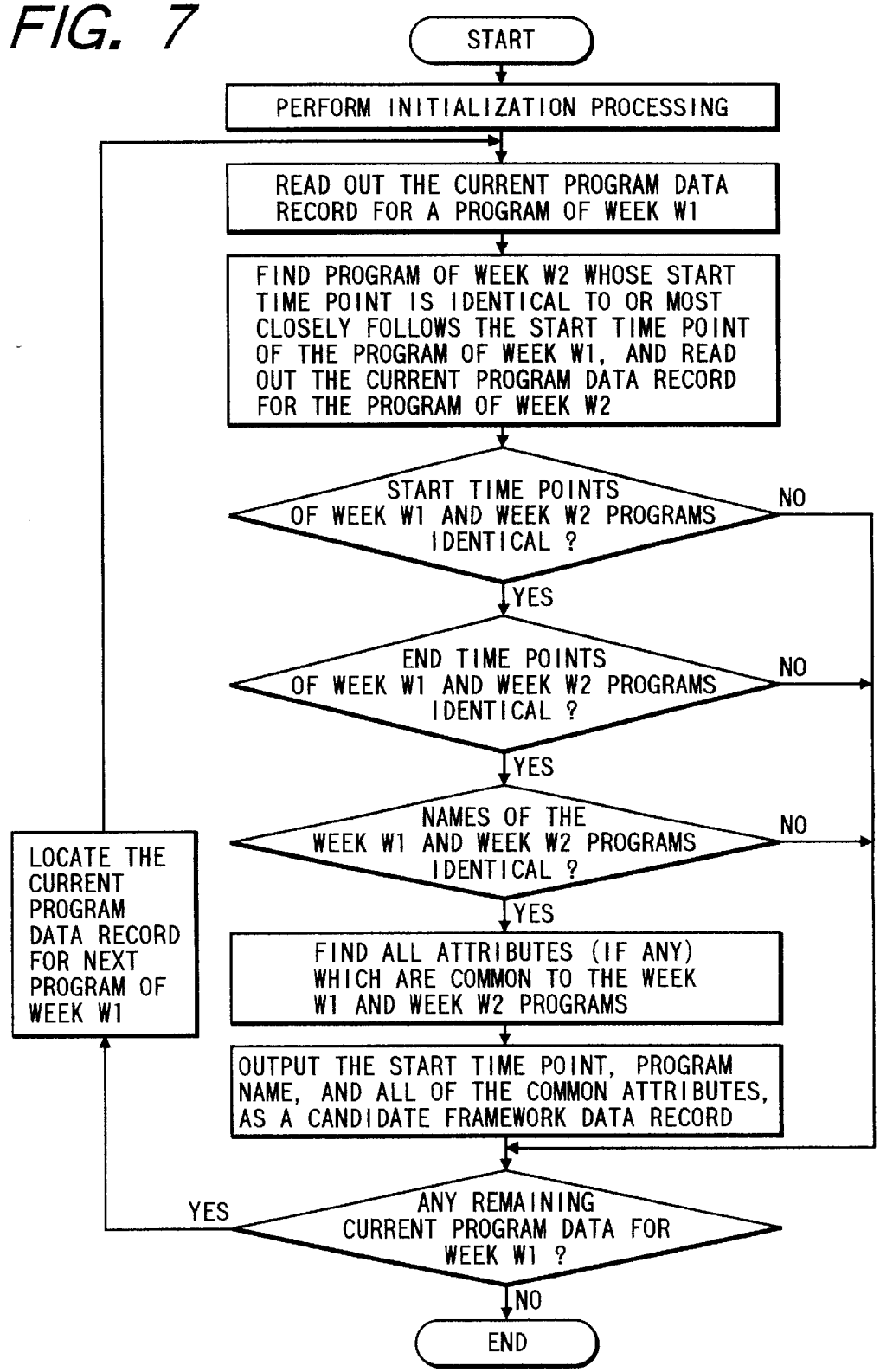
FIG. 7 is a flow diagram showing an example of an algorithm for deriving successive sets of candidate framework data for one program data unit in respective pairs of weeks.

FIG. 7 is a flow diagram showing a simple example of an algorithm for deriving such candidate program data by comparing each program of a program data unit for a first week (designated as W1) with the programs of the corresponding program data unit for a second week (designated as W2).

Figure 8:
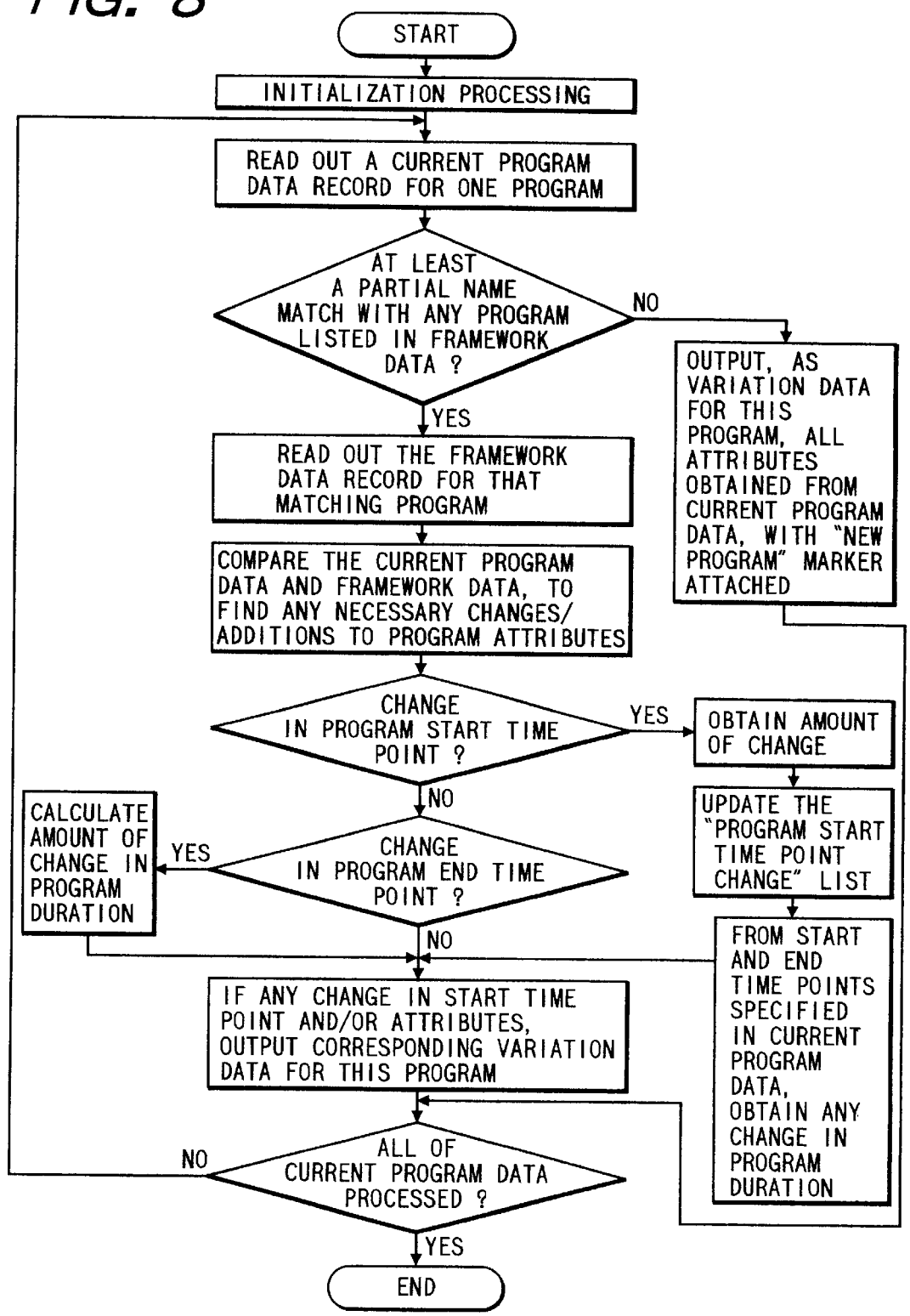
FIG. 8 is a flow diagram showing an example of an algorithm for deriving variation data by comparison of newly acquired current program data with framework data.

FIG. 8 is a flow diagram of an example of processing which can be executed to generate one or more updated variation data records for a program data unit, each time that new current program data are received by the current program data acquisition section 3 of the information providing apparatus 1. The "program start time point change" list referred to in FIG. 8 corresponds to the column "starting time point change amount" in the variation data table of FIG. 4. As shown, when it is found from the current program data that a new program has been inserted into a program data unit, a marker bit is attached to the variation data record which is generated for that program, as a "new program" marker.

Figure 9:
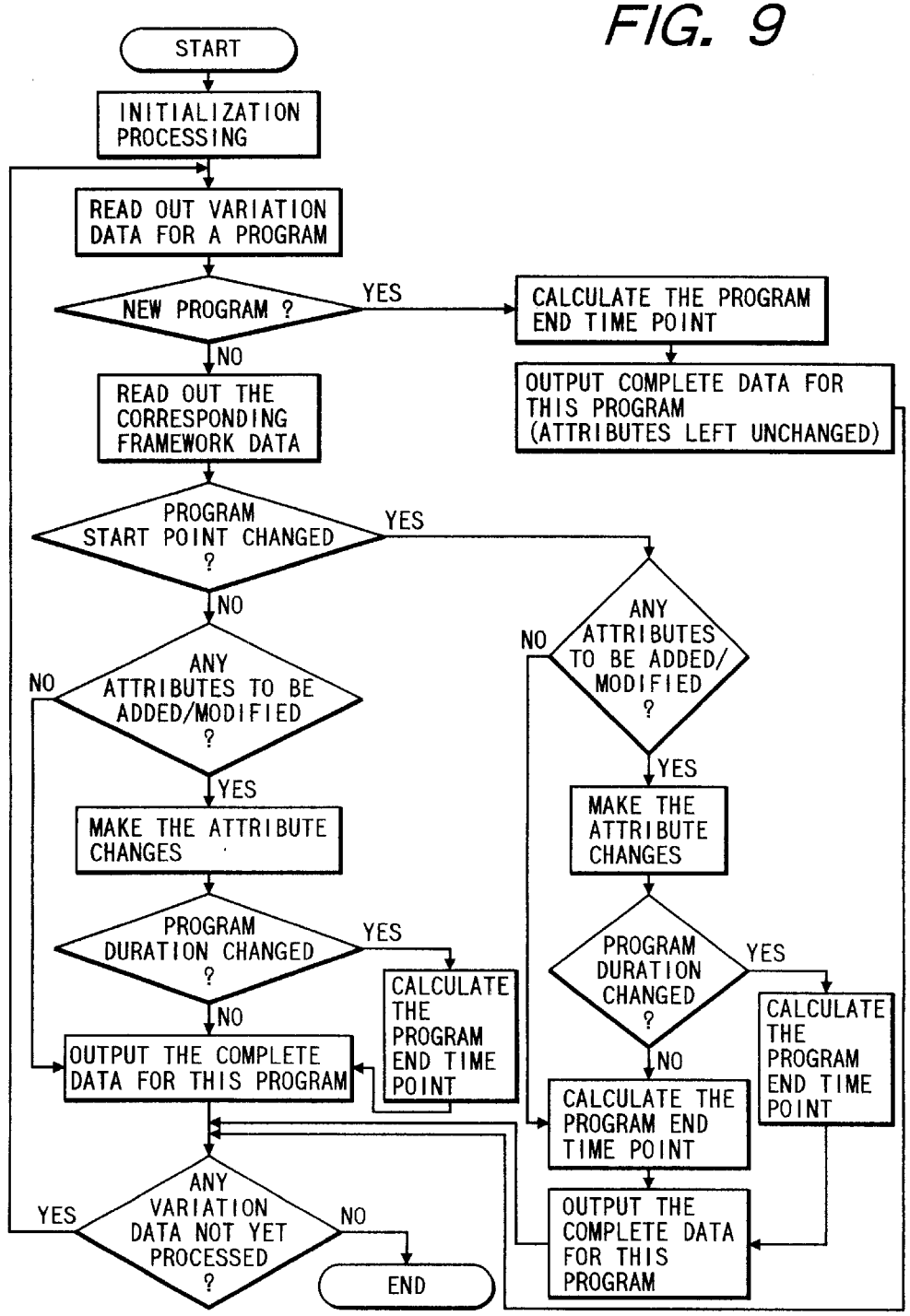
FIG. 9 is a flow diagram showing an example of an algorithm for reconstituting program data by combining framework data with variation data.

FIG. 9 is a flow diagram of an example of processing which can be executed by the data reconstitution section 13 of FIG. 2, to combine the variation data and framework data to obtain final program schedule information, for each program (of a specific program data unit) having a variation data record. The result of the processing performed in each step designated as "output the completed data for this program" is to output the start and and time points, program name, and all other attributes of the program concerned. For simplicity of description, only the processing performed for each program having a variation data record is shown (since the complete data for any other program can be directly obtained from the framework data).

Such processing can of course be easily modified to derive data for only one or more specific programs of a program data unit, when this is requested by a user.

In the above description, it has been assumed that the information receiving apparatus 2 can always access the information providing apparatus 1 to obtain any data which may be required for updating the contents of the program data storage section 12, so that the user can always be provided with the most up-to-date program information. However even if it is temporarily impossible for the information receiving apparatus 2 to acquire program data from the information providing apparatus 1 (e.g. due to such reasons as a communication line fault, insufficient storage capacity within the information receiving apparatus 2, etc.), it is still possible for the user to obtain program information based on the current contents of the program data storage section 12, which will in most cases be substantially complete and accurate. This represents another basic advantage of such a system, by comparison with a system in which, when a user issues a request for program information, all of the necessary data must be dispatched at that time from the information providing apparatus to the user's information receiving apparatus.

The data reconstitution section 13 of this embodiment also has a function for searching for information concerning specific types of programs, in response to user requests. The user might input a request to search for programs of a specific type, as a command from the operating section 15, whereupon a search is performed of the contents of the data storage section 12 to generate a program list in accordance with the contents of the command. For example, if the user wishes information on sports programs, and so inputs a command to search for sports programs, then the data reconstitution section 13 searches the data storage section 12 to extract only data concerning sports programs, reconstitutes the data into suitable form for display, and supplies the resultant program data to the display section 14.

In the above description of the system embodiment of FIGS. 1 and 2, it has been assumed that the data editing section 5 separates the program data into only two categories of data (the framework data and variation data), with a corresponding pair of data storage sections 6A, 6B being utilized for these respectively. However as mentioned previously, it would be equally possible to classify the program information into three or more data levels, with a corresponding set of three or more data storage sections (6A, 6B, 6C . . . ) being used for these. In that case, the data editing section 5 of the information providing apparatus 1 could for example classify the program information into the framework data and a plurality of types of variation data, in accordance with the respective degrees of magnitudes of data variation. In that case, designating the variation data as being divided into a total of n levels, with the degree of data variation successively increasing from the first level to the n-th level, it would be possible to configure the data editing section 5 to operate such that variation data of any arbitrarily determined set of levels (e.g., from the m-th to the n-th levels) can be read out from the program data storage section 6 and dispatched to an information receiving apparatus when necessary.

Furthermore, it is possible to combine the processing operation for dividing the program data into multiple levels in that way with the processing that is executed to select transmission paths. A specific example will be described in the following, whereby the processing that is executed for selecting program data (to be sent to users) from multiple levels of stored program data are combined with the processing for selecting the data transmission paths to be used for dispatching the respective categories of program data to users. The case will be considered in which the variation data data, for updating the contents of the variation data storage section 12B, are sent automatically to each information receiving apparatus by the information providing apparatus each time that updated current program data are acquired by the information providing apparatus (i.e., rather than in response to specific requests for program data transmitted from users). It will be assumed that the program data held in the program data storage section 6 are divided into four categories, i.e. the framework data (one level) and three levels of variation data, and that the transmission path 18 can be configured as a combination of paths via a data communication network and via a television broadcasting system respectively. It will be assumed that program data of the respective levels are updated in the following manner: framework data are sent to users only once in each half-year; first-level variation data are sent to users once per week (for example, based on data obtained from a schedule of television program broadcasts which is published once per week); second-level variation data are sent to users during the day previous to the broadcast (or broadcasts) to which the data relate, or during the day on which that broadcast occurs; and third-level variation data are sent immediately to the users, but only when necessary.

That is to say the data are classified as:
(a) the framework data, which are generated when program editing is performed by the information providing apparatus, and are dispatched to users once in each half-year;
(b) the weekly data (i.e., first-level variation data), transmitted once per week and consisting, for example, of information concerning performers and subtitles for that week;
(c) the daily data (i.e., second-level variation data), transmitted once per day, either on the day previous to the corresponding broadcast or on the day of that broadcast and which consist, for example, of information concerning the contents of news programs or current events programs; and
(d) the temporary data (i.e., third-level variation data), which are only dispatched to users when necessary and consist of information concerning, for example, changes in broadcast times of programs due to extension of the duration of a baseball broadcast, or due to a special news report being broadcast.

The framework data are stored in the framework data storage section 6A, while the weekly data, the daily data, and the temporary data are stored in respective regions of the variation data storage section 6B.

It will be assumed that, having been separated into multiple levels in that way, the program data are transmitted to users via the following respective forms of transmission paths. The framework data and the first-stage variation data (i.e., the weekly data) are transmitted via a telephone network. The second-level variation data (i.e., the daily data) and the third-level variation data (i.e., the temporary data) are transmitted via the television broadcasting system, for example by using a technique such as VBI for insertion of text into transmitted video signals.

In that way, a service can be provided whereby the communication cost is maintained at a low level, while continuously enabling accurate program schedule information to be available for display by each user, since the variation data held at each information receiving apparatus is always maintained in an up-to-date condition.

With the above example, the respective ways in which to implement the transmission path 18 are statically specified, for each of the data categories. That is to say, it is fixedly specified that the framework data and the weekly data are to be transmitted via a telephone line, while the daily data and the temporary data are to be transmitted via the television broadcasting system (by VBI).

An embodiment will now be described, in which the transmission path 18 to be used for each type of program data are selected dynamically. In that case it is necessary to provide, within the dispatch path determining section 21, a transmission path selection reference register and a transmission path selection section (not shown in the drawings). The transmission path selection reference register might hold, for example, the following sets of attribute information for the case of transmission via a public telephone system and for the case of transmission via the television broadcasting system by using VBI, respectively:
  (a) communication cost (telephone system: 10 cents for 3 minutes, VBI: no cost),
  (b) communication speed (telephone system: 2K bytes per second, VBI: several characters per second),
  (c) the data transmission conditions at the current point in time (for telephone system: effective transmission factor; for VBI: operating status of the television broadcasting system).

The above attribute information can be updated when necessary, in accordance with any changes which may occur, such as a telephone system failure.

When it is necessary to dispatch data to a user, the transmission selection means uses the above parameters in a predetermined equation to select an appropriate path to be used as the transmission path 18, or to select an appropriate combination of paths for respective categories of data. In that way, the transmission paths can be dynamically selected in accordance with current conditions.

In practice, when using a broadcast system (e.g. through VBI) for the data transmission, it is preferable to apply some form of error correction technique, since there is a strong possibility of information drop-out. For example, triplicate sequential transmission of the same data can be used for error correction, to obtain increased reliability. It is especially important to achieve reliable data transfer for the highest level of program data, i.e., the framework data, since any errors contained in such data will have a long-term effect upon resultant reconstituted program data. However from considerations of communication costs, it may be decided that no particular error correction measures are necessary for the lowest-level variation data. For that purpose, a reliability information register is preferably provided in the information providing apparatus, in the form of a table which defines the respective degrees of importance of the various data categories, together with a transmission method selection section, in the form of a table which specifies respective error correction countermeasures that are to be applied for the different program data categories (i.e., the framework data, and the various levels of variation data) in accordance with their respective degrees of importance. The reliability information register and the transmission method selection section can be configured within the data dispatching section 7.

It should be noted that similar measures to improve reliability of data transmission, determined in accordance with the levels of importance of the data to be transmitted, could be applied in the case of using transmission paths other than via a broadcasting system, e.g., via a network such as the Internet, when there is a possibility of information drop-out during transmission.

As will be apparent from the above description, the data dispatching section 7 (operating under the control of the control section 9) of the information provider apparatus 1 can be configured to transmit updating data to each information receiving apparatus 2 only at the time when such updating data actually becomes necessary, i.e., when a user inputs a request for program information to an information receiving apparatus 2. Alternatively, the data dispatching section 7 can be configured to initiate the dispatching of such updating data to the information receiving apparatuses on a regular basis and also when unexpected changes occur in the program data, i.e., to transmit the updating data in response to updated current program data, which may be acquired at any arbitrary point in time.

The regular dispatching of data could be done for example on a base schedule of sending to each information receiving apparatus a complete set of framework data and variation data once every six months, and sending updated variation data once per week.

Alternatively, the control section 9 can be configured to control the data dispatching section 7 such that a single set of framework data and an initial set of variation data are transmitted to each information receiving apparatus, with only updated variation data being sent thereafter.

It would of course be possible to use any of various possible combinations of the above forms of control.

As described above, the information receiving apparatus 2 includes an attribute information storage section 19 having stored therein attribute information relating to the information receiving apparatus 2 itself, as well as user attribute information, and may also contain the aforementioned customized data, with at least one user of the information receiving apparatus being linked to a corresponding set of customized data as described above. A user can input an attribute data sending request via the operating section 15, to transmit to the information provider apparatus 1 the apparatus attribute information and/or the user attribute information, or such attribute information may be attached by the information receiving apparatus to the contents of a request for program data which are sent to the information providing apparatus, as described above. In such a case, the attribute data are read out from the attribute information storage section 19, transmitted, and then stored in the attribute information storage section 20 of the information provider apparatus 1.

In that way, various attribute information relating to each information receiving apparatus and to users of the information receiving apparatuses are stored at the information provider apparatus 1. As a result, when a request for dispatch of information is received by the information providing apparatus 1 from a user, program information can be dispatched which is modified (e.g., with respect to the degree of detail of the information contents) in accordance with the attributes of that particular user and the attributes of the user's information receiving apparatus. That is to say, the program information which is dispatched can be appropriately selected by the information providing apparatus 1 such as to be appropriately matched to the requirements of the receiving user and/or to the configuration of the information receiving apparatus of that user. More comprehensive and individualized services can thereby be provided than has been possible in the prior art. In addition, customized information for respective users may also be utilized, as described above.

In the above description, it has been assumed that the information to be provided consists of broadcast program information. However the present invention is not limited to providing such information, and could for example also be applied to the case of supplying catalog information for use in mail order shopping, or shopping performed via a communication network such as the Internet. In that case, marketing information relating to items which are sold for the entire duration of one year could be established as the framework data, while information concerning items for which the volume of sales varies in accordance with the season could be established as the variation data. If that is done, each data item of the current program data, and each data record that is stored as the framework data and variation data, could consist of the name and code number of a sales item, in conjunction with information specifying one or more attributes of that sales item (such as price, color, etc.). Furthermore, within such variation data, a number of different levels of variation data could be generated, and respectively updated as required, for example data which are changed in accordance with the seasons, data which are changed from month to month, and data which are changed from day to day.

More specifically, in the case of such shopping data, the variation data and framework data contents might basically consist of the following: Framework data: sales item codes, photographs of sales items, general descriptions of items, price information. Variation data: colors which can be specified for a sales item, item attributes (e.g., size, etc.), information concerning bargain sales, information concerning special prices for certain items which are on sale, information specifying the periods for which bargain sales will be held.

It should be noted that since large amounts of data are required to convey photographic information, it is especially advantageous to provide such information in the form of framework data.

The invention could moreover be valuable in the field of providing traffic information to automobiles. In that case, the variation data and framework data contents might basically consist of the following: Framework data: map information, place codes, place names. Variation data: sets of data relating to respective occurrences of road traffic congestion, e.g. with each set containing: {place code, information specifying the type of congestion (e.g., light, slow-moving, movement halted), current distance from the congestion position}.

The invention could moreover be applied to providing weather information. In that case, the variation data and framework data contents might basically consist of the following: Framework data: regional maps, icons representing conditions such as {fair weather} or {high pressure region}, place codes, place names. Variation data: sets of data, each consisting for example of {place name code, icon codes, attribute values (e.g. for temperature, etc.)}, and also position coordinate information for isobaric lines, and position coordinate information for high-pressure regions, etc, for use in generating a weather map. Other types of information to which the present invention could be applied include travel agency information, airline ticket reservation information, information concerning various events and motion pictures, plays, etc.

The invention could also be advantageously applied to providing other types of information. With all such types of information, by using an information providing system according to the present invention, the amount of data which must be transmitted when information is dispatched can be reduced by comparison with prior art types of system, and the communication time and expense required to transfer information can be thereby significantly reduced. It can thus be understood that the present invention provides significant advantages in the general field of information providing.

What is claimed is:

1. An information providing method for use with an information providing system having an information providing apparatus, at least one information receiving apparatus, and means for transferring data between the information providing apparatus and information receiving apparatus, the method comprising:

at said information providing apparatus, editing and separating original information which is to be provided into first data and second data, storing the first data and second data as respectively separate data categories, and subsequently reading out and transmitting the first data and second data to the information receiving apparatus with respectively different values of time interval between successive transmissions of said first data and between successive transmissions of said second data, and wherein the method further includes storing a data dispatch record in data dispatching storage section each time said first or second data is transmitted to the receiver apparatus and searching the data dispatch records in said data dispatching storage section prior to the transmission of said or first or second data to the receiver apparatus at said information receiving apparatus, receiving the transmitted first data and second data and storing the received first data and second data respectively separately, and subsequently responding to a request for output of a part of said original information by reading out and combining respectively parts of said stored first data and second data, to reconstitute said part of the original information;

detecting an interval between successive updating occurrences of said original information or detecting the amount of charge which results from updating of said original information whereby said first data are obtained from said original information as a part of said original information which satisfies a selection condition that that the interval between successive updating occurrences is longer than a predetermined duration, or that the amount of change which results from updating of said original information is less than a predetermined amount, and whereby said second data are obtained from said original information as a part of said original information which does not satisfy said selection condition, wherein said original information consists of program broadcast schedule information in which data items identify a specific program and convey attribute information relating to the broadcast of said program, storing said data items in said information providing apparatus as program data records expressing broadcast information for respective programs.

2. An information providing method according to claim 1, whereby said original information is periodically acquired by said information providing apparatus as successive sets of updated original information, and whereby said first data are obtained by comparing the contents of each of a plurality of pairs of said sets, to extract information that is common to all of said pairs of said sets and which satisfies said selection condition.

3. An information providing method according to claim 2, whereby after said first data and said second data have been obtained and stored by said information providing apparatus, each subsequent one of said sets of updated original information is compared with said stored first data to obtain updating data as data which are contained in said updated original information and not in said first information providing apparatus, and said updating data are stored at said information providing apparatus as an updated part of said second data.

4. An information providing method according to claim 3 whereby said updating data, when obtained, are transmitted to said information receiving apparatus and are stored at said information receiving apparatus as an updated part of said second data.

5. An information providing method according to claim 3 whereby said information providing apparatus maintains a record of data which have been transmitted to said information receiving apparatus, whereby when a request for output of data is input to said information receiving apparatus, said request is transmitted by said information receiving apparatus to said information providing apparatus, and whereby said information providing apparatus responds by judging said transmitted data records in relation to said request to determine if transfer of updating data to said information receiving apparatus is necessary for enabling said information receiving apparatus to reconstitute said requested data, and by transmitting said updating data to said information receiving apparatus when it is found necessary.

6. An information providing system comprising an information providing apparatus, at least one information receiving apparatus, and data transfer means for use in transmitting data between said information providing apparatus and information receiving apparatus, said information providing apparatus comprising
original information storage means for receiving and storing original information which is supplied from an external source and is periodically updated, data editing means for operating on said stored original information to separate said original information into first data and second data, data storage means for storing said first data and said second data, and data transmitting means for transmitting data to said information receiving apparatus via said data transfer means, wherein said information providing apparatus further includes a data dispatching section which stores a data dispatch record in a dispatch record storage section each time said first or second data is transmitted to the receiver apparatus, and wherein the data dispatch records in the data dispatching storage section are first searched prior to the transmission of said first or second data to the receiver apparatus said data editing means detects an interval between successive updating occurrences of said original information or detects the amount of change which results from updating of said original information wherein said first data are obtained from said original information as a part of said original information which satisfies a selection condition that the interval between successive updating occurrences is longer than a predetermined duration, or that the amount of change which results from updating is less than a predetermined amount, and wherein said second data are obtained as a part of said original information for which said selection condition is not satisfied;

and wherein said information receiving apparatus comprises receiving means for receiving said first data and said second data transmitted from said information providing apparatus, storage means for storing the received first data and second data, and data reconstitution means responsive to an externally supplied request for output of a part of said original information for reading out and combining respective parts of said stored first data and second data, to thereby reconstitute said part of the original information wherein said original information consists of program broadcast schedule information in which data items identify a specific program and convey attribute information relating to a broadcast of said program, and wherein said data editing means further comprises means for storing said data items in said data storage means of the information providing apparatus as program data records expressing broadcast information for respective programs.

7. An information providing system according to claim 6, wherein said original information is periodically acquired by said information providing apparatus as successive sets of updated original information, and wherein said data editing means comprises means for comparing the contents of each of a plurality of pairs of successive ones of said sets, to extract information which is common to all of said of pairs plurality and which satisfies said selection condition.

8. An information providing system according to claim 7 wherein said data editing means further comprises means, functioning after said first data and second data have been obtained and stored, for comparing each subsequent one of said sets of original information with said stored first data to thereby obtain updating data as data which are contained in said updated original information and not in said stored first data, and for storing said updating data in said data storage means of said information providing apparatus as an updated part of said second data.

9. An information providing system according to claim 8 wherein said information providing apparatus further comprises means for transmitting said updating data to said information receiving apparatus each time that said updating data are derived, and wherein said information receiving apparatus comprises means for storing said updating data in said data storage means of said information receiving apparatus as an updated part of said second data.

10. An information providing system according to claim 6, wherein said information receiving apparatus means further comprises means for responding to said request by transmitting said request to said information providing apparatus via said data transfer means, and said data dispatch record means stores dispatch record data indicative of an updating status of said first data and said second data which are currently stored at said information receiving apparatus, in relation to said first data and said second data that are currently stored at said information providing apparatus, and wherein said information providing apparatus further comprises means responsive to the contents of said request transmitted from said information receiving apparatus and to said dispatch record data for judging whether it necessary to transmit updated data to said information receiving apparatus in order to enable said information receiving apparatus to correctly reconstitute said part of the original information, and if said updated data are judged to be necessary, reading out said updated data from said data storage means of the information receiving apparatus and transmitting said updated data to said information receiving apparatus via said data transfer means, to be stored in said data storage means of said information receiving apparatus.

11. An information providing system according to claim 6, wherein said second data are obtained from said original information as a plurality of levels of second data, said levels of second data having successively increasing smaller values of said interval between successive updating occurrences, or exhibiting successively greater values of said amount of change as a result of updating.

12. An information providing apparatus according to claim 6, wherein said data transfer means comprises a plurality of respectively different data communication paths, and wherein said information providing apparatus comprises means for selecting, based upon whether said first data or second data is to be transmitted, one of said data communication paths to be utilized for transmitting data to said information receiving apparatus.

13. An information providing system according to claim 6 wherein said information receiving apparatus further comprises means for inputting apparatus attribute information relating to said information receiving apparatus, and means for transmitting said apparatus attribute information to said information providing apparatus; and wherein said information providing apparatus further comprises means for storing said apparatus attribute information which is transmitted from said information receiving apparatus.

14. An information providing system according to claim 13, wherein said information receiving apparatus comprises means for attaching said apparatus attribute information to a request for output of a part of the original information, for thereby transmitting said apparatus attribute information, together with said request, via said data transfer means to said information providing apparatus.

15. An information providing system according to claim 13, wherein said apparatus attribute information relates to one or more apparatus attributes, included in a set of apparatus attributes that includes data storage capacity, image display resolution capability, data processing performance, and types of secondary data storage media which can be connected for use with said information receiving apparatus.

16. An information providing system according to claim 13, wherein said data transfer means comprises a plurality of respectively different data communication paths, and wherein said information providing apparatus comprises means for selecting, based upon said apparatus attribute information, one or a combination of said plurality of data communication paths for use in transmitting data to said information receiving apparatus.

17. An information providing system according to claim 6, wherein said information receiving apparatus further comprises means for inputting user attribute information relating to said information receiving apparatus, and means for transmitting said user attribute information to said information providing apparatus; and wherein said information providing apparatus further comprises means for storing said user attribute information which is transmitted from said information receiving apparatus.

18. An information providing system according to claim 17, wherein said information receiving apparatus comprises means for attaching said user attribute information to said request for output of a part of said original information, for thereby transmitting said user attribute information, together with said request, via said data transfer means to said information providing apparatus.

19. An information providing system according to claim 17, wherein said user attribute information relates to one or more user attributes, from a set which include the age of said user, the sex of said user, and the area of residence of said user.

20. An information providing system according to claim 19, wherein said user attribute information comprises customized user attribute data, expressing individual preferences of respective users with regard to providing of data by said information providing system.

21. An information providing system according to claim 19, wherein said information providing apparatus further comprises means for selecting, based on said user attribute information, data which are read out from said data storage means of the information providing apparatus and transmitted to said information receiving apparatus.

22. An information providing system according to claim 19, wherein said information providing apparatus further comprises means for determining, based on said user attribute information, a frequency of transmitting data from said information providing apparatus to said information receiving apparatus for updating the contents of said data storage means of said information receiving apparatus.

23. An information providing system according to claim 19, wherein said data transfer means comprises a plurality of respectively different data communication paths, and wherein said information providing apparatus comprises means for selecting, based upon said user attribute information, one or a combination of said plurality of data communication paths for use in transmitting data to said information receiving apparatus.

24. An information providing system according to claim 23, wherein said information providing apparatus comprises means for storing attribute information relating to said data communication paths, and wherein said one or a combination of data communication paths is selected based upon said user attribute information and said data communication path attribute information in combination.

25. An information providing system according to claim 24, wherein said attribute information relating to the data communication paths is selected from a set of attribute information which includes data transfer speed and communication cost.

26. An information providing system according to claim 24, wherein said one or a combination of data communication paths is fixedly selected in accordance with at least said user attribute information and said data communication path attribute information, in combination.

27. An information providing system according to claim 24, wherein said data communication path attribute information may be altered in accordance with current conditions of respective data communication paths, and wherein said one or a combination of data communication paths is dynamically selected, in accordance with at least said user attribute information and the current status of said data communication path attribute information, in combination.

28. An information providing system according to claim 6, wherein said data editing means further comprises means functioning, when an updated set of said original information is received by said information providing apparatus, to compare said updated original information with said first data stored in said data storage means of said information providing apparatus for thereby deriving any differences between said updated original information and said stored first data as updating data, and for storing said updating data in said data storage means to thereby update said second data.

29. An information providing system according to claim 6, wherein said information providing apparatus further comprises means for transmitting said updating data to said information receiving apparatus via said data transfer means, to be stored in said data storage means of said information receiving apparatus to thereby update said second data which are held therein.

30. An information providing system according to claim 6 wherein said data transfer means is selected as one or a combination of a plurality of data transfer means which include a data communication path via a communication network based on dedicated communication lines or public telephone lines, a data communication path established via a terrestrial or satellite radio broadcasting system, physical transport of data stored on optical recording discs, and physical transport of data stored on magnetic recording discs.

31. An information providing system according to claim 6, wherein said original information is formed as a plurality of respectively identified data items, each data item including identifier data and data expressing at least one attribute, and wherein said data editing means extracts said first data from said original information by processing said original information during a predetermined initial processing period which extends over a plurality of successive updatings of said original information, to select respective data items for which at least one attribute satisfies said selection condition during said initial processing period.

32. An information providing system according to claim 31 wherein said data editing means further comprises means functioning, when a set of updated original information is received by said information providing apparatus subsequent to said initial processing period, to judge each data item of said set in relation to said first data stored in said data storage means of the information providing apparatus to thereby detect any changed data for at least one attribute of any of said data items, and to store said changed attribute data in said data storage means to update said second data.

33. An information providing system according to claim 6, wherein said first data are derived in said initial processing period as respective ones of said program records, each specifying a name of a program and attribute information including at least a starting time point and a duration of a broadcast of said program.

34. An information providing system according to claim 33 wherein said data editing means further comprises means whereby, subsequent to said initial processing period, when a set of updated original information is received by said information providing apparatus, starting time point values for respective programs contained in said updated original information are compared with corresponding starting time point values which have been stored as said first data, and any difference between an updated starting time point for a program and a corresponding previously stored starting time point value is expressed as a positive or negative time increment value and is stored as part of said second data, in said data storage means of said information providing apparatus, as said attribute information in conjunction with the name of said program in a program data record.

35. An information providing system according to claim 34 wherein said data editing means further comprises means functioning subsequent to said initial processing period, when a set of updated original information is received by said information providing apparatus, to compare program names contained in said updated original information with program names contained in said first data which have been stored in said data storage means of the information providing apparatus, to detect any new program name, and for storing each said new program name and all corresponding said attribute information as a new program data record which is part of said second data, in said data storage means.

* * * * *